US007565698B2

(12) United States Patent
Isozaki et al.

(10) Patent No.: US 7,565,698 B2
(45) Date of Patent: Jul. 21, 2009

(54) INFORMATION-PROCESSING DEVICE

(75) Inventors: Hiroshi Isozaki, Kawasaki (JP); Takeshi Saito, Meguro-ku (JP); Tatsuyuki Matsushita, Kawasaki (JP); Tooru Kamibayashi, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 870 days.

(21) Appl. No.: 10/984,989

(22) Filed: Nov. 10, 2004

(65) Prior Publication Data

US 2005/0118987 A1 Jun. 2, 2005

(30) Foreign Application Priority Data

Nov. 11, 2003 (JP) ............................ 2003-381518

(51) Int. Cl.
*H04K 1/00* (2006.01)

(52) U.S. Cl. .......................... 726/26; 726/30; 380/201; 380/255

(58) Field of Classification Search ................. 380/270, 380/201, 255; 726/30, 26
See application file for complete search history.

(56) References Cited

U.S. PATENT DOCUMENTS

| | | | | |
|---|---|---|---|---|
| 6,189,146 | B1 | 2/2001 | Misra et al. | |
| 6,253,326 | B1 * | 6/2001 | Lincke et al. | 726/12 |
| 7,107,620 | B2 * | 9/2006 | Haverinen et al. | 726/29 |
| 2002/0035594 | A1 | 3/2002 | Dreke et al. | |
| 2002/0120847 | A1 | 8/2002 | Kamperman | |
| 2002/0157002 | A1 | 10/2002 | Messerges et al. | |
| 2002/0161997 | A1 * | 10/2002 | Yamasaki et al. | 713/150 |
| 2003/0018491 | A1 | 1/2003 | Nakahara et al. | |
| 2003/0131129 | A1 | 7/2003 | Becker et al. | |
| 2003/0198349 | A1 | 10/2003 | Aizu et al. | |
| 2003/0204723 | A1 | 10/2003 | Narin et al. | |
| 2004/0053622 | A1 | 3/2004 | Nakakita et al. | |

(Continued)

FOREIGN PATENT DOCUMENTS

WO WO 98/31124 7/1998

(Continued)

OTHER PUBLICATIONS

U.S. Appl. No. 10/599,958, filed Oct. 16, 2006, Saito, et al.

(Continued)

*Primary Examiner*—Matthew B Smithers
*Assistant Examiner*—Ali S Abyaneh
(74) *Attorney, Agent, or Firm*—Oblon, Spivak, McClelland, Maier & Neustadt, P.C.

(57) ABSTRACT

An information-processing device includes a first interface configured to transmit content to a first communication unit through a network, a second interface configured to receive a first unique identification allocated to the first communication unit from a second communication unit and transmit a second unique identification allocated to the information-processing device to the second communication unit, an identification list configured to store at least one unique identification through the second interface and an identification judgment unit configured to determine whether the first unique identification received through the first interface is stored in the identification list, wherein when the identification judgment unit determines that the unique identification of the first communication unit is stored in the identification list, the first interface allows the content to be transmitted to the first communication unit.

16 Claims, 16 Drawing Sheets

U.S. PATENT DOCUMENTS

| | | | |
|---|---|---|---|
| 2005/0118987 | A1 | 6/2005 | Isozaki et al. |

FOREIGN PATENT DOCUMENTS

| | | | |
|---|---|---|---|
| WO | WO 00/22510 | | 4/2000 |
| WO | WO 02/42901 | A2 | 5/2002 |
| WO | WO 02/101577 | A1 | 12/2002 |
| WO | WO 03/003687 | A1 | 1/2003 |
| WO | WO 03/079638 | A1 | 9/2003 |

OTHER PUBLICATIONS

Curt Franklin, "How Bluetooth Works", How Stuff Works, XP-002380993, Oct. 2, 2003, 12 pages.

Jonas Aslund, "Authentication in Peer-to-peer systems", Examensarbete, XP-002296476, May 16, 2002, pp. I-XII, and 1-120.

Menezes et al., "Handbook of Applied Cryptography, Passage", Handbook of Applied Cryptography, CRC Press Series on Discrete Mathematices and its Applications, XP-002289766, 1997, pp. 388-389.

* cited by examiner

| ESSENTIAL ITEMS | OPTION ITEMS | |
|---|---|---|
| DOMAIN UNIQUE ID | REGISTRATION DATE AND HOUR | DEVICE UNIQUE INFORMATION |
| AA | 2003/10/20/12:00:00 | XX:YY:ZZ:AA |
| BB | 2003/10/21/12:00:00 | AA:BB:CC:DD |
| CC | 2003/10/22/12:00:00 | EE:FF:00:11 |
| ... | ... | |

ESSENTIAL ITEMS

| DEVICE UNIQUE ID | UNIQUE DOMAIN ID |
|---|---|
| xxyyxx | AA |
| aabbcc | BB |
| eeffdd | CC |
| ... | |

OPTION ITEMS

| REGISTRATION DATE AND HOUR | DEVICE UNIQUE INFORMATION |
|---|---|
| 2003/10/20/12:00:00 | XX:YY:ZZ:AA |
| 2003/10/21/12:00:00 | AA:BB:CC:DD |
| 2003/10/22/12:00:00 | EE:FF:00:11 |
| ... | |

FIG. 23
| DEVICE UNIQUE ID | ITEMS IN THE DOMAIN ID LIST |
|---|---|
| AA | XX, BB |
| BB | CC |
| BB | DD |
| BB | AA |
| XX | ZZ |
| ... | |
FIG. 24
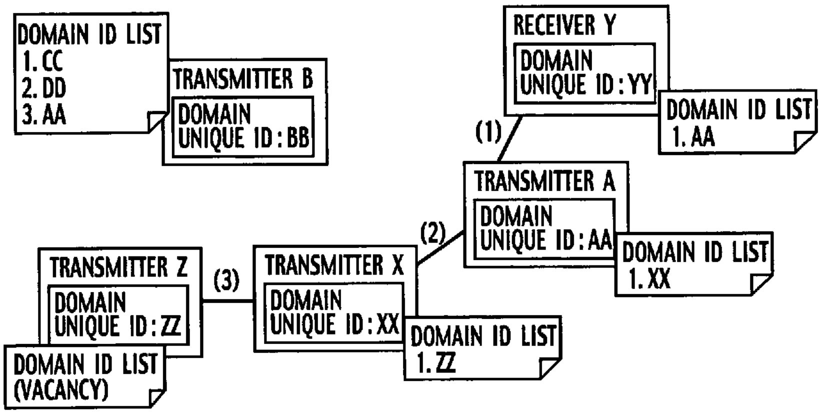
FIG. 25
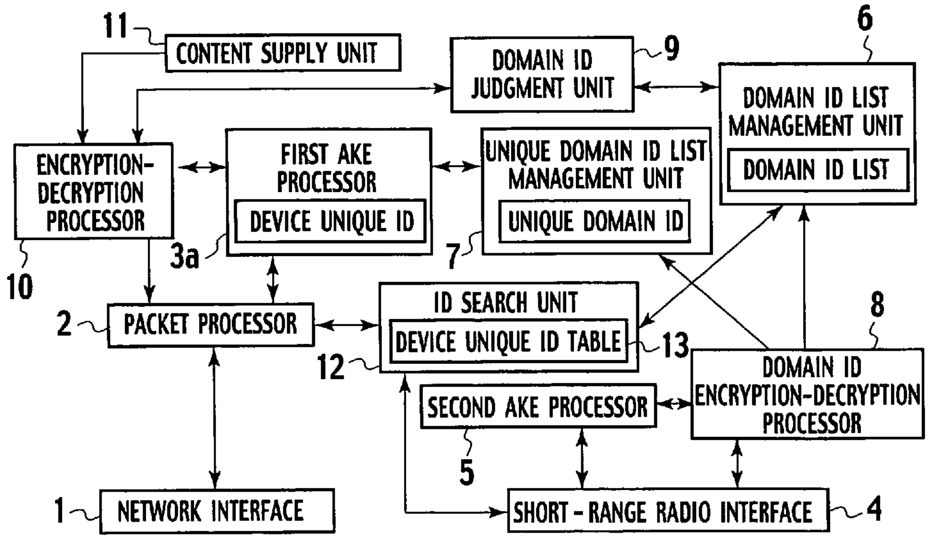

INFORMATION-PROCESSING DEVICE

CROSS REFERENCE TO RELATED APPLICATIONS

This application is based upon and claims the benefit of priority from prior Japanese Patent Application P2003-381518 filed on Nov. 11, 2003; the entire contents of which are incorporated by reference herein.

BACKGROUND OF THE INVENTION

1. Field of the Invention

The present invention relates to an information-processing device that transmits a variety of content needed to achieve copyright protection.

2. Description of the Related Art

With dissemination and digitalization of computer network in recent years, products, called as digital information electric appliances, are widely spread in use. Further, with start of ground wave digital broadcasting service, digital broadcasting-compliant televisions, STB (Set Top Box) and DVD recorders are predicted to become further widespread in the future. If these digital electric appliances are connected over a network, users are available to enjoy a variety of content via the home network with a resultant increase in utility value.

As used herein, the term "content" refers to various digital data, involving moving image data, such as MPEG2 and MPEG4, and audio data, and in addition to these, document data such as text data and still image data. Content composed of this kind of digital data is advantageous in that it can be easily copied without deteriorations, and then again, attention needs to be paid for copyright of content. For instance, in the case where content to be protected under copyright is transmitted from a certain transmitter to a receiver, an area available for exchanging content, whose copyright is to be protected, is limited to a certain range, for instance, an area under an legitimate authority such as an area for private use defined under the Copyright Act or a further narrowed area. It is preferable for content to be restricted from exchanging with a third party in an area beyond such a limited range.

However, in the event of transmitting AV data on IP (Internet Protocol), IP has a capability of transmitting data without any physical restrictions in a cable length. Therefore, issues easily occur on a copyright law. That is, in IP, technology, a so-called VPN (Virtual Private Network) in which IP networks can be logically connected to one another in remote areas, becomes widely used. By such technology, for example, it enables to logically connect equipment in a home network of Mr. X's residence in a district A with equipment in another home network of Mr. Y' residence in another district B (physically remote from the district A) for transmitting AV data. For this reason, content in the Mr. X's residence is not closed within the home network of Mr. X's residence. Then, Mr. Y in a remote place can browse content on the network owned by Mr. X by connecting the Mr. Y's home network to Mr. X's home network.

SUMMARY OF THE INVENTION

The present invention has been provided to solve the above issues with an information-processing device by which a qualified user is able to effectively utilize content while achieving copyright protection.

An aspect of the present invention inheres in an information-processing device including a first interface configured to transmit content to a first communication unit through a network, a second interface configured to receive a first unique identification allocated to the first communication unit from a second communication unit and transmit a second unique identification allocated to the information-processing device to the second communication unit, an identification list configured to store at least one unique identification through the second interface and an identification judgment unit configured to determine whether the first unique identification received through the first interface is stored in the identification list, wherein when the identification judgment unit determines that the unique identification of the first communication unit is stored in the identification list, the first interface allows the content to be transmitted to the first communication unit.

Another aspect of the present invention inheres in an information-processing device for communicating with a first and a second communication units, including an identification list configured to store a first unique identification allocated to the first communication unit, an interface configured to transmit the first unique identification to the second communication unit in response to an identification request when a round trip time between the second interface and the second communication unit is less than a given threshold value and an identification list management unit configured to receive a second unique identification stored in the second communication unit and store the second unique identification in the identification list.

Still another aspect of the present invention inheres in an information-processing device communicating with a first and a second communication units through a network, including an identification list configured to store at least one unique identification, an interface configured to transmit a first unique identification, allocated to the information-processing device, to the first communication unit and receive a second unique identification allocated to the first communication unit, an identification judgment unit configured to determine whether the second unique identification is stored in the identification list, a first AKE processor configured to execute an AKE processing with the first communication unit when the second unique identification is stored in the identification list, an encryption-decryption processor configured to receive an encrypted third unique identification, allocated to the second communication unit as a key, via the first communication unit from the second communication unit after the successful AKE processing and a second AKE processor configured to execute an AKE processing with the second communication unit based on the third unique identification for transmitting encrypted content to the second communication unit.

Still another aspect of the present invention inheres in an information-processing device communicating with a first and a second communication units, including an identification list configured to store at least one unique identification, an interface configured to receive a first unique identification allocated to the first communication unit and address information of the second communication unit from the first communication unit in response to an identification check request, an identification check unit configured to determine whether the first unique identification is stored in the identification list, receive a second unique identification allocated to the second communication unit when the first unique identification is stored in the identification list, and determine whether the second unique identification is stored in the identification list; and an encryption-decryption processor configured to transmit an encrypted third unique identification, allocated to the first communication unit as a key, to the second communication unit and transmit an encrypted fourth unique identification, allocated to the second communication unit as a key, to the first communication unit, when the second unique identification is stored in the identification list.

Still another aspect of the present invention inheres in an information-processing device, including a first interface configured to transmit content to a first communication unit through a network, an identification list configured to store both of at least one unique public identification and at least one first corresponding secret identification, a first AKE processor configured to execute an AKE processing with the first communication unit, a second interface configured to receive an encrypted second unique secret identification allocated to the first communication unit after the successful AKE processing when the second secret identification is not stored in the identification list and a second AKE processor configured to execute an AKE processing with the first communication unit based on the second secret identification.

BRIEF DESCRIPTION OF THE DRAWINGS

FIG. 23 is a view showing an example of a device unique ID table.

FIG. 24 is a view illustrating communication units including domain unique IDs and a domain ID lists.

FIG. 25 is a block diagram illustrating an example of an internal structure of the transmitter provided with device unique ID table.

DETAILED DESCRIPTION OF EMBODIMENTS

Figure 1:
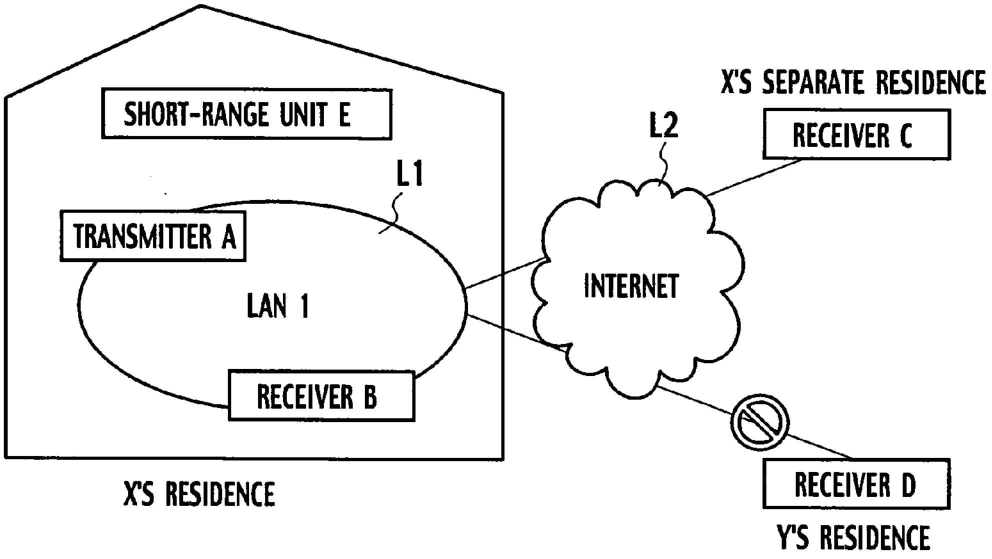
FIG. 1 is a block diagram illustrating an overall structure of a first embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following description specific details are set forth, such as specific materials, process and equipment in order to provide thorough understanding of the present invention. It will be apparent, however, to one skilled in the art that the present invention may be practiced without these specific details. In other instances, well-known manufacturing materials, process and equipment are not set forth in detail in order not unnecessary obscure the present invention.

Hereinafter, embodiments according to the present invention are described with reference to the accompanying drawings.

First Embodiment

FIG. 1 is a block diagram illustrating an overall structure of an information-processing system of a first embodiment according to the present invention. The information-processing system shown in FIG. 1, includes communication units such as a transmitter A and receiver B that are connected to a local area network L1 located in a Mr. X's residence, a short-range radio unit E available to communicate with the transmitter A and receiver B only within the residence, a receiver C located outside the residence (Mr. X's separate residence) operative to be connected to the local area network (LAN) L1 through an Internet L2, and a receiver D outside the residence in a Mr. Y's residence.

In FIG. 1, the respective units (receivers C, D), connected to the Internet L2, and the local area network L1 may be connected to a router that is not shown.

As a physical layer and link layer of the local area network 1, a variety of forms may be adopted which include a wireless LAN such as IEEE802.11 and Ethernet (Registered Trade Mark), IEEE1394, and the like. Internet Protocol (IP) used as a network layer of the local area network 1 may be IPv4 or IPv6. Also, the local area network 1 may be connected to other units omitted herein.

As used herein, the term "content" refers to digital content, for example, moving picture data such as MPEG2 and MPEG4, audio data such as MP3, text data, and image data. For the first embodiment, the transmission of content to be transmitted under copyright protection will be described below.

In the case where content is transmitted to the receivers B, C, D from the transmitter A, the point to be noted is copyright protection for content. As set forth above, an area available for exchange of relevant content is limited to a certain range, for instance, a legitimate authority area such as a particular area for private use defined under the Copyright Act or an another area that is further narrower than the above area, and it is desirable to be unable for content to be exchanged with other persons beyond the limit of such a range.

According to the present invention, the transmitter A, owned by Mr. X, permits content to be transmitted to or received from the receivers B, C but content is unable to be transmitted to the receiver D owned by different owner. With the first embodiment, at least one of unique IDs allocated to the transmitter, the receiver, and another communication unit is registered in both of the transmitter and the receiver so as to limit a content distribution range to a certain content distribution area. A receiver without the ID has no permission for receiving content and decrypting encrypted content.

Figure 2:
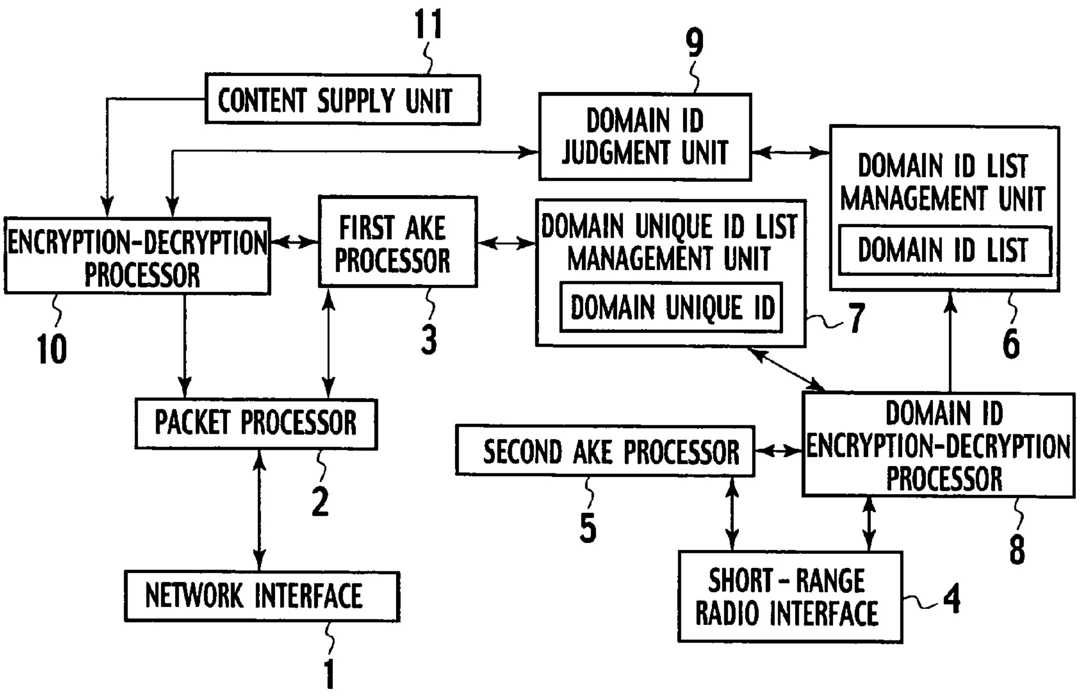
FIG. 2 is a block diagram showing an example of an internal structure of a transmitter A.

FIG. 2 is a block diagram illustrating an example of an internal structure of the transmitter A. As shown in FIG. 2, the transmitter A includes a network interface 1, a packet processor 2, a first authentication and key exchange (AKE) processor 3, a short-range radio interface 4, a second authentication and key exchange (AKE) processor 5 for a short-range radio interface 4, a domain ID list management unit 6, a domain unique ID management unit 7, a domain ID encryption-decryption processor 8, a domain ID judgment unit 9, an encryption-decryption processor 10 and a content supply unit 11.

The network interface 1 executes physical layer processing as well as data link layer processing to establish communication with the receiver B. The packet processor 2 executes network layer and transport layer processing for performing communication with the receiver B. The first AKE processor 3 executes the authentication and key exchange (AKE) processing with the receiver B. The short-range radio interface 4 executes physical layer processing and data link layer processing for achieving communication with the short-range radio unit E. The short-range radio second AKE processor 5 executes the AKE processing with the short-range radio unit E. The domain ID list management unit 6 is operative to store a domain unique ID supplied from the short-range radio interface 4 in a domain ID list and transmit a data for the domain ID list in response to a request from the domain ID judgment unit 9. The domain unique ID management unit 7 stores the domain unique ID, which is a unique ID of the short-range radio unit E. The domain unique ID is transmitted via the short-range radio interface 4 or the network interface 1. The domain ID encryption-decryption processor 8 serves to encrypt and decrypt the domain unique ID and data for the domain ID list using a key obtained as a result of AKE processing in the second AKE processor 5. The domain ID judgment unit 9 determines whether the domain unique ID of the receiver B, inputted from the network interface 1, is registered in the domain ID list. The encryption-decryption processor 10 encrypts content to be transmitted. The content supply unit 11 stores content to be supplied to the packet processor 2.

In the following example, it is assumed that information processed in the packet processor 2 is transmitted under Internet Protocol, and "short-range radio" refers to infrared ray radiation and radio for a radio frequency tag (RF tag). Although the term "short-range radio" is used herein as an example, any communication method is available for the present invention. Information processed with the network interface 1 is performed in a logical address space and is not limited to a physical range. In the meanwhile, information processed with the short-range radio interface 4 is limited to a physical range within reach of infrared ray radiation, radio for the RF tag, or an IC card and a magnetic card (in non-radio mode).

Figures 3, 4:
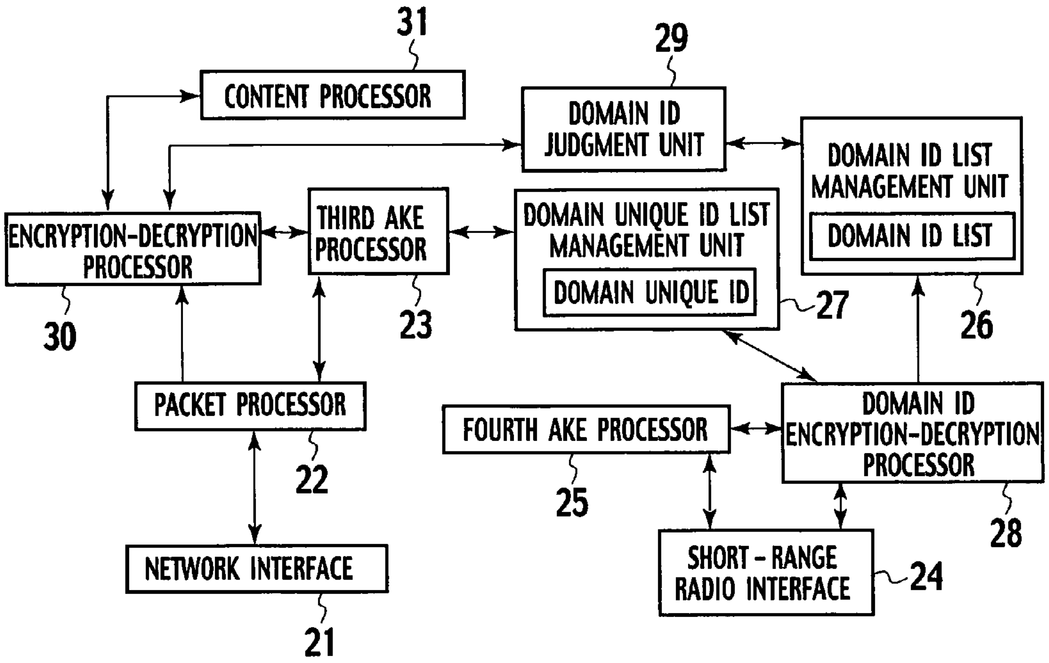
FIG. 3 is a block diagram showing an example of an internal structure of a receiver B.
FIG. 4 is a view showing an example of a domain ID list stored in domain ID list management units.

FIG. 3 is a block diagram illustrating an example of an internal structure of the receiver B. As shown in FIG. 3, the receiver B includes a network interface 21, a packet processor 22, a third authentication and key exchange (AKE) processor 23, a short-range radio interface 24, a fourth authentication and key exchange (AKE) processor 25, a domain ID list management unit 26, a domain unique ID management unit 27, a domain ID encryption-decryption processor 28, a domain ID judgment unit 29, an encryption-decryption processor 30 and a content processor 31.

The network interface 21 executes physical layer processing and data link layer processing for achieving communication with the transmitter A. The packet processor 22 executes network layer processing and transport layer processing for performing communication with the receiver B. The third AKE processor 23 executes the AKE processing with the transmitter A. The short-range radio interface 24 executes physical layer processing and data link layer processing for achieving communication with the short-range radio unit E. The fourth AKE processor 25 executes the AKE processing with the short-range radio unit E. The domain ID list management unit 26 is operative to store the domain unique ID supplied from the short-range radio interface 24 in the domain ID list and transmit data for the domain ID in response to a request from the domain ID judgment unit 29. The domain unique ID management unit 27 stores the domain unique ID, which is a unique ID of the short-range radio unit E. The domain unique ID is transmitted via the short-range radio interface 24 or the network interface 21. The domain ID encryption-decryption processor 28 serves to encrypt and decrypt the domain unique ID and the domain ID list using a key obtained as a result of short-range radio AKE processing. The domain ID judgment unit 29 determines whether the domain unique ID of the transmitter A inputted from the network interface 21 is registered in the domain ID list. The encryption-decryption processor 30 serves to decrypt received content. The content processor 31 executes processing for outputting content to a display device or storing the content.

Also, the network interface 21, the packet processor 22, the third AKE processor 23, the short-range radio interface 24, the fourth AKE processor 25, the domain ID list management unit 26, the domain unique ID management unit 27, the domain ID encryption-decryption processor 28 and the domain ID judgment unit 29 may be comprised of the same component parts as those of the transmitter A.

The domain ID list management unit 26 has a function to add the domain unique ID received from a short-range radio unit to the domain ID list, as long as the short-range radio unit is authenticated to be legitimate.

FIG. 4 is a view illustrating an example of the domain ID list stored in the domain ID list management units 6, 26. The domain ID list includes compulsory items and option items. Contained in the essential items are domain unique IDs stored in the transmitter A or the receiver B, and the option items include date and hour for storing the domain IDs in the domain ID list, and an interface ID such as MAC addresses of the network interface 1, 21.

The domain ID list can be registered in the domain unique IDs with an infinite number (for instance, N-pieces). The domain ID list management units 6, 26 include non-volatile memory areas to store data for the domain ID lists.

The domain ID list management 6, 26 do not need to add a domain unique ID, which has already been stored in the domain ID list, when the domain ID list management units 6, 26 receive the domain unique ID from the transmitter or receiver. When the domain unique ID already stored in the domain ID list is received, the date and hour of the option item may be updated. In the case where domain ID list has no vacancy to store the domain unique ID, the domain ID list management 6, 26 may reject the adding of new domain unique ID, or the domain ID list management 6, 26 may replace the earliest stored domain unique ID or selected domain unique ID with the new domain unique ID. A message may be displayed to a user for selecting the replaced domain unique ID.

The term "AKE processing" refers to the operation for mutually authenticating between the transmitter and the receiver, or between the transmitter and the short-range radio unit, or between the receiver and the short-range unit. Each device has the certificate and secret key. Each device can generate the shared key when they successfully processed the mutual authentication which is made using the certificate and secret key licensed by a certain License Organization. Also, the domain unique IDs, prepared in the transmitter A and the receiver B, may preferably have licensed domain unique IDs.

The authenticating method may include a well-known process like ISO/IEC 9798-3 and ISO/IEC 9798-2. The encryption-decryption processor 10, 30 and the domain ID encryption-decryption processor 8, 28 may have functions to encrypt content, data for the domain ID list and the domain unique ID with the shared key after the authentication processing. An encryption algorism for encrypting and decrypting these data may include a well-known method such as AES.

Figure 5:
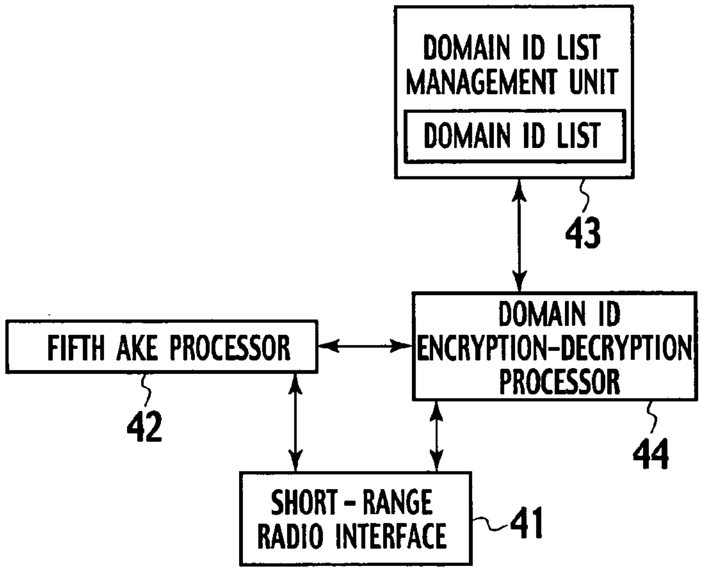
FIG. 5 is a block diagram showing an example of an internal structure of a short-range radio unit.

FIG. 5 is a block diagram illustrating an example of an internal structure of the short-range radio unit E. As shown in FIG. 5, the short-range radio unit E includes a short-range radio interface 41, a fifth authentication and key exchange (AKE) processor 42, a domain ID list management unit 43 and a domain ID encryption-decryption processor 44.

The short-range radio interface 41 executes physical layer processing and data link layer processing for achieving short-range radio communication between the transmitter A and the receiver B. The fifth AKE processor 42 executes AKE processing between the transmitter A and the receiver B. The domain ID list management unit 43 is operative to retrieve the domain unique ID stored in the transmitter A and the receiver B via the short-range radio interface 41 to store the infinite number of the domain unique IDs in the domain ID list and to transmit data for the stored domain ID list. The domain ID encryption-decryption processor 44 serves to encrypt and decrypt the domain unique ID and data for the domain ID list with the shared key obtained in the AKE processing. The domain ID list management unit 43 includes non-volatile memory areas for storing data for the domain ID lists.

Figure 6:
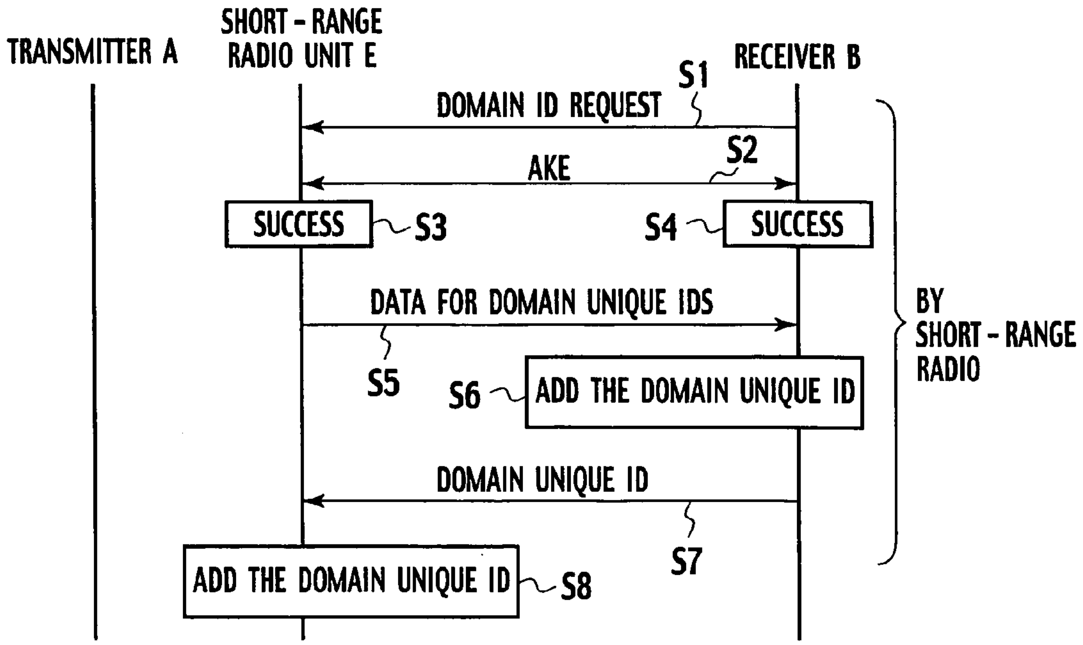
FIG. 6 is a view illustrating an ID registering operating for registering the domain unique ID of the receiver in the short-range radio unit.
Figure 7:
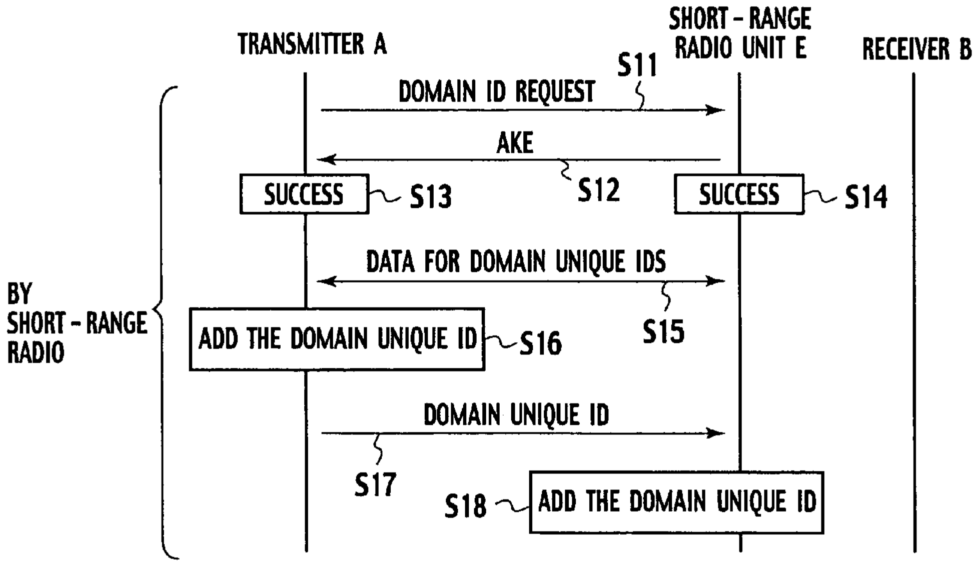
FIG. 7 is a view illustrating an operational sequence of registering the domain unique ID of the transmitter in the domain ID list of the short-range radio unit.

FIGS. 6 and 7 are sequence diagrams illustrating examples of operations (hereinafter referred to as ID registering operation) for registering the domain unique ID among the transmitter A, the receiver B and the short-range radio unit E. In the ID registering operations shown in FIGS. 6 and 7, the transmitter A exchanges the domain unique IDs with the receiver B using the short-range radio unit E. At least one of the transmitter A and the receiver B may store the domain unique ID stored in the other using the short-range radio unit E.

FIG. 6 shows the ID registering operating for registering the domain unique ID of the receiver B in the short-range radio unit E. First, the receiver B transmits a domain ID request to the short-range radio unit E (step S1). Upon receipt of this request, the short-range radio unit E and the receiver B execute authentication and key exchange so as to verify the legitimation mutually (step S2).

If the authentication is failed, given error operation is executed and no subsequent operation proceeds. If the authentication is successful (steps S3, S4), the short-range radio unit E transmits data for domain unique IDs, which are registered in the domain ID list, to the receiver B (step S5). In this event, the data for domain unique IDs may be preferably added with a signature, may be encrypted with the shared key generated in the AKE processing so as to preclude the data for domain unique IDs from being altered illegitimately over a communication pathway. If any of the domain unique IDs are not registered in the domain ID list of the short-range radio unit E, an error message to indicate that no domain ID is registered in the domain ID list may be transmitted to the receiver B.

Upon receipt of the data for domain unique ID, the receiver B adds the domain unique ID to the domain ID list (step S6). If the domain unique ID is already registered in the domain ID list, the domain unique ID may not be added or may be updated the previous domain unique ID.

Subsequently, the receiver B transmits the domain unique IDs, stored in the receiver B, to the short-range radio unit E (step S7). In this event, the domain unique IDs may be preferably added with a signature to preclude the domain unique IDs from being altered illegitimately. Also, the domain unique IDs may be preferably encrypted with the shared key generated in the AKE processing to transmit.

Receiving the domain unique IDs from the receiver B, the short-range radio unit E adds content of the domain unique ID to the domain ID list within the receiver B (step S8). In this event, if the domain unique IDs are already registered in the domain ID list, the domain unique ID may not be added or may be updated the previous domain unique ID.

A series of above-mentioned operations are executed by short-range radio communication via the short-range radio interfaces 41 provided in the transmitter A, the receiver B and the short-range radio unit E, respectively. Based on round trip time (RTT) measured between the transmitter A or the receiver B and the short-range radio unit E, the series of above-mentioned operations are executed only if the measured RTT is less than a given threshold value.

With the operations executed as set forth above, the receiver B is able to get the data of domain unique IDs stored in the short-range radio unit E and the short-range radio unit E is able to get the domain unique ID of the receiver B.

FIG. 7 shows an operational sequence of registering the domain unique ID of the transmitter A in the domain ID list of the short-range radio unit E. In the first embodiment, the operations shown in FIG. 7 follows the operations shown in FIG. 6.

First, the transmitter A transmits a domain ID request to the short-range radio unit E (step S11). Upon receipt of this request, the short-range radio unit E and the transmitter A execute authentication and processing key exchange so as to verify the legitimation mutually (stepS12). If the authentication is failed, given error operation is executed and no subsequent operation proceeds. If the authentication is successful (steps S13, S14), the short-range radio unit E transmits data for a list of domain IDs, which are registered in the domain ID list, to the transmitter A (step S15). In the sequence shown in FIG. 6 described above, since the domain unique ID stored in the receiver B is registered in the domain ID list of the short-range radio unit E, the transmitter A receives the domain unique ID from the short-range radio unit E to add the domain unique ID to the domain ID list (step S16).

As the domain unique ID is transmitted, a signature may be preferably added to the domain unique ID to preclude the list of domain unique IDs from being altered illegitimately or the domain unique ID may be preferably encrypted by the shared key generated in the AKE processing.

The transmitter A transmits the domain unique ID stored in the transmitter A to the short-range radio unit E (step S17). In this event, the domain unique ID may be preferably added with a signature to preclude the domain unique ID from being altered illegitimately or preferably be encrypted by the shared key generated in the AKE processing. Upon receipt of the domain unique ID, the short-range radio unit E serves to add content of the domain unique ID to the domain ID list of the short-range radio unit E (step S18).

Through the sequence set forth above, the domain unique ID of the receiver B is added to the domain ID list of the transmitter A, and the domain unique IDs of the transmitter A and the receiver B are added to the domain ID list of the short-range radio unit E.

Although in FIG. 6 and FIG. 7, the receiver B and the transmitter A send the domain ID request to the short-range radio unit E to initiate the operational sequence, on the contrary, the short-range radio unit E may send the domain ID request to the receiver B and the transmitter A to commence the AKE processing.

When the domain ID list of the short-range radio unit E has no vacancy for storing the domain unique IDs received from the transmitter A and the receiver B, the short-range radio unit E may execute at least one of the following operations. The short-range radio unit E may replace the earliest-stored domain unique ID with the new domain unique ID. The short-range radio unit E may send an error message to the transmitter A and the receiver B. The short-range radio unit E may indicate selection information so as to select the domain unique ID deleted from the domain ID list of the short-range radio unit E.

In the foregoing, the ID registering operations have been described above. Hereunder, content transmission operations will be described. In the content transmission operations, AV content is transmitted from the transmitter A to the receiver B.

Figure 8:
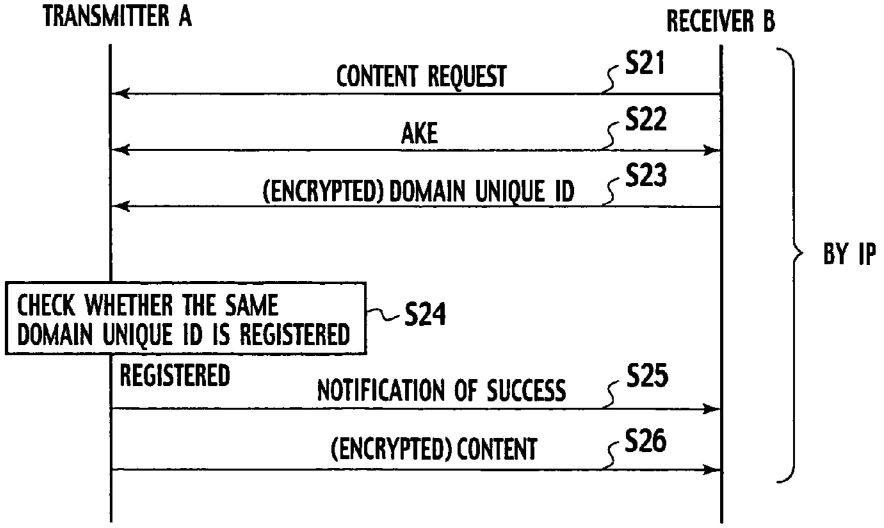
FIG. 8 is a view illustrating a sequence in which content is transmitted from the transmitter to the receiver.
Figure 9:
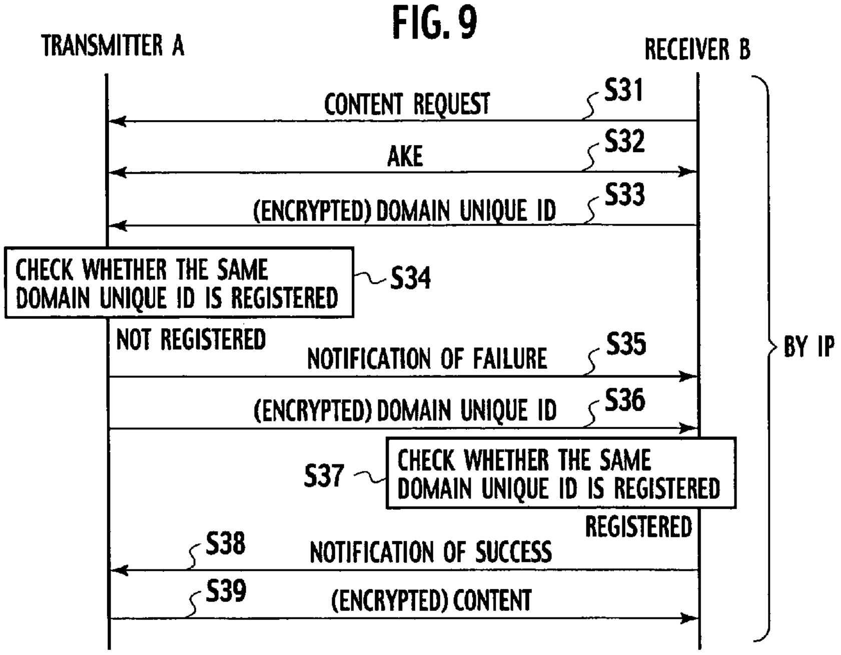
FIG. 9 is a view illustrating an operational sequence in which the domain unique ID of the transmitter is registered in the domain ID list of the receiver.

FIGS. 8 and 9 are sequence diagrams showing examples of operational sequence of content transmission operations among the transmitter A, the receiver B. In the content transmission operations shown in FIGS. 8 and 9, prior to the operation of the transmitter A for transmitting content, the operation is executed to check whether the transmitter A has the ID registered in the receiver B or, in contrast, whether the receiver B has the ID registered in the transmitter A. If at least one of transmitter A and the receiver B has the domain unique ID registered in the other, content is permitted for transmission whereas if not, the transmission of content is rejected.

FIG. 8 shows a sequence in which content is transmitted from the transmitter A to the receiver B. The domain unique ID registered in the receiver B is contained in the domain ID list of the transmitter A. First, the receiver B transmits a content request to the transmitter A (step S21). In response to this request, the transmitter A and the receiver B mutually execute AKE processing (step S22). If the AKE processing is completed and the shared key is generated, the receiver B encrypts the domain unique ID with the shared key to transmit to the transmitter A (step S23).

Upon receipt of the domain unique ID of the receiver B, the transmitter A checks whether the same domain unique ID is registered in the domain ID list of the transmitter A (step S24). In this event, since the same domain unique ID is registered in the domain ID list of the transmitter A in the preceding ID registering operation, this checking operation is successful and a message is transmitted to the receiver B to notify that the checking operation of the ID is successful (step S25). Then, the transmitter A begins to transmit content to the receiver B (step S26).

FIG. 9 shows an operational sequence unlike the case in FIG. 8. The domain unique ID of the receiver B is not registered in the domain ID list of the transmitter A and, on the contrary, the domain unique ID of the transmitter A is contained in the domain ID list of the receiver B. This situation arises when the order of the ID registering operations shown in FIGS. 6 and 7 are reversed. That is, in this situation, the short-range radio unit E first stores the domain unique ID of the transmitter A, then stores the domain unique ID of the receiver B.

After a content request transmitted to the transmitter A (step S31), the transmitter A and the receiver B mutually execute the AKE processing (step S32) and the transmitter A receives the domain unique ID from the receiver B (step S33). The operations so far may be executed in the same steps as those of FIG. 8.

The transmitter A, which has received the domain unique ID from the receiver B, checks whether the same domain unique ID is registered in the domain ID list (step S34). In this event, since the same domain unique ID of the receiver B is not registered in the domain ID list of the transmitter A, the checking operation is failed. Then, the transmitter A sends a notification of the failure to the receiver B (step S35) and encrypts the domain unique ID of the transmitter A for transmission to the receiver B (step S36).

The receiver B, which has received the domain unique ID from the transmitter A, checks whether the same domain unique ID is registered in the domain ID list (step S37). Since the domain unique ID of the transmitter A is preliminarily registered in the receiver B, this checking operation is successful and, hence, the receiver B transmits a message to the transmitter A notifying the success (step S38). The transmitter A begins to transmit content to the receiver B (step S39).

The series of operations in the content transmission operations are executed with the network interface 1, 21 used for transmitting and receiving content.

In the content transmission operations, after determining at least one of the transmitter A and the receiver B stores the same domain unique ID of the other, the transmitter A transmit content to the receiver B.

While the content request precedes the AKE processing and ID check processing in the first embodiment, the content request may follow the AKE processing and ID check processing.

While the shared key generated the AKE processing in the first embodiment is used for encrypting the domain unique ID, another shared key obtained through another AKE processing may be available.

Modified Form 1 of the First Embodiment

In the ID registering operation set forth above, after the AKE processing with the short-range radio unit E, both of the domain unique ID and a device unique ID may be transmitted to the short-range radio unit E. When transmitting both the domain unique ID and the device unique ID, the device unique ID may not need to be kept in secret, in contrast, the domain unique ID needs to be kept in secret not to be altered or wiretapped in the middle of communication and, thus, the domain unique ID may be encrypted for transmission in security.

The term “device unique ID” refers to a unique ID that is uniquely identified for each of the transmitter A and the receiver B.

Figure 10:
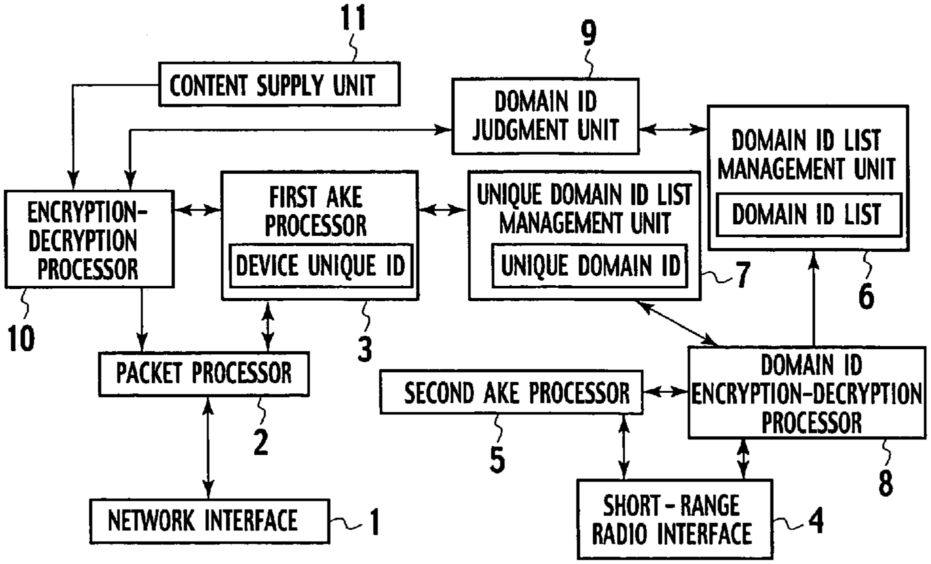
FIG. 10 is a block diagram illustrating an example of an internal structure of the transmitter that transmits both a domain unique ID and a device unique ID.
Figures 11, 12:
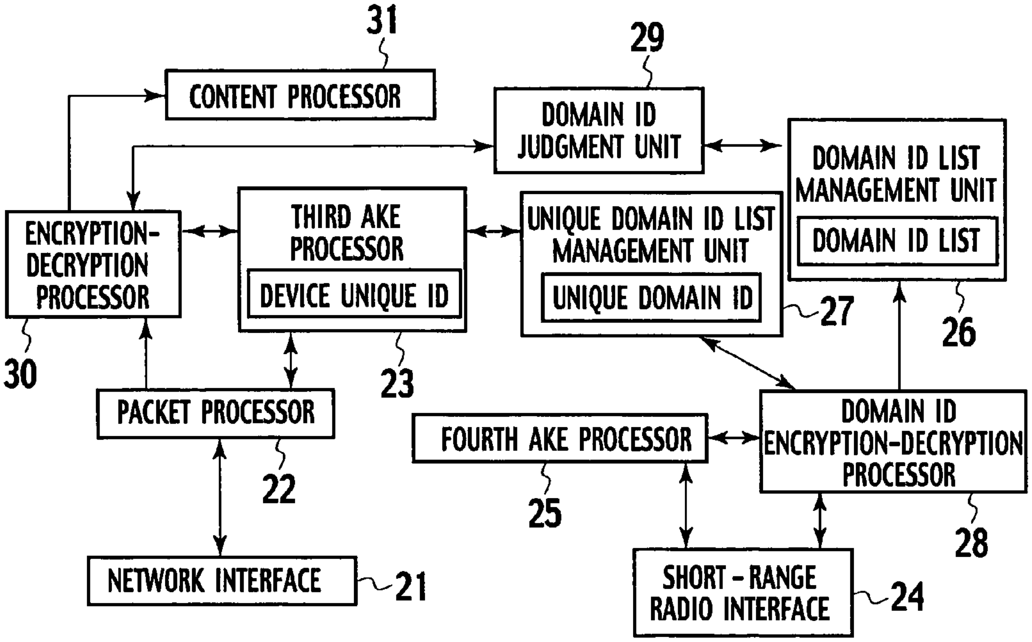
FIG. 11 is a block diagram illustrating an example of an internal structure of the receiver that transmits both the domain unique ID and the device unique ID.
FIG. 12 is a view illustrating an example of a domain ID list in the transmitter, the receiver and the short-range radio unit, which register both the domain unique ID and the device unique ID.

FIGS. 10 and 11 are block diagrams showing examples of internal structures of the transmitter A and the receiver B adapted to transmit both the domain unique ID and the device unique ID. The transmitter A, shown in FIG. 10, differs from the transmitter A shown in FIG. 2 only in that the first AKE processor 3 has the device unique ID. The receiver B, shown in FIG. 11, differs from the receiver B shown in FIG. 3 only in that the third AKE processor 23 has the device unique ID.

The device unique ID may take an assigned value contained in a certificate in the AKE processing. The certificate legitimates a public key licensed for a public key cryptography FIG. 12 is a view illustrating an example of a domain ID list in the transmitter A, the receiver B and the short-range radio unit E by which both the domain unique ID and the device unique ID are transmitted. The domain ID list shown in FIG. 12 includes, in addition to the list shown in FIG. 4, the device unique ID as the compulsory item. Data for the domain unique IDs is in secret values not to be wiretapped during communication with the short-range radio unit E. Also, the data for the domain unique IDs is stored securely in a manner that prevents from tampering. In contrast, the device unique ID has no need to particularly take a secret value and may be available to be retrieved from common interfaces such as network interfaces.

Since the device unique ID may be available for a user to browse, the short-range radio unit E may be provided with an interface to display a value of the device unique ID registered in the domain unique ID list of the transmitter A or the receiver B.

Figure 13:
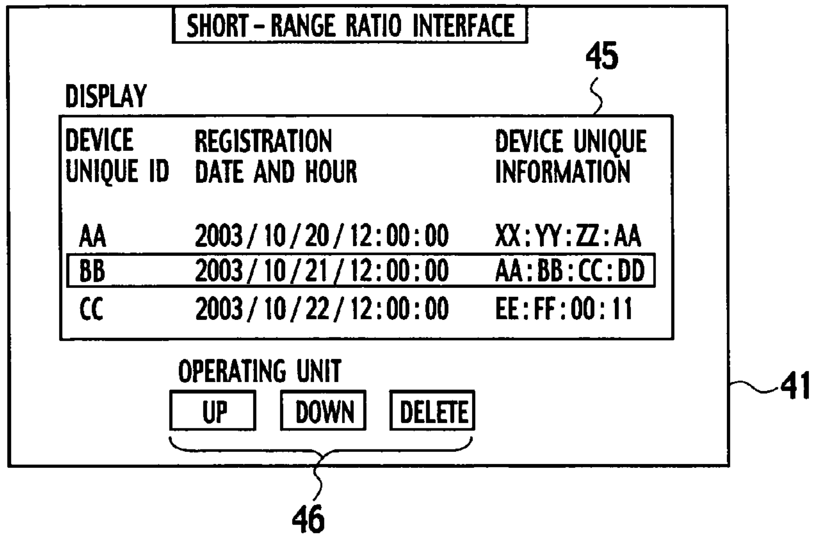
FIG. 13 is a view illustrating an example of a display panel of a short-range radio unit with a function to display a value of the device unique ID.

FIG. 13 is a view illustrating an example of a display panel of the short-range radio unit E that has a function to display the device unique ID. A display 45 is provided with a display indicating the device unique ID, registration date and hour, and device unique information. Located below the display 45 is an operating unit 46 to shift a cursor in the display 45 and to delete displayed information.

Figure 14:
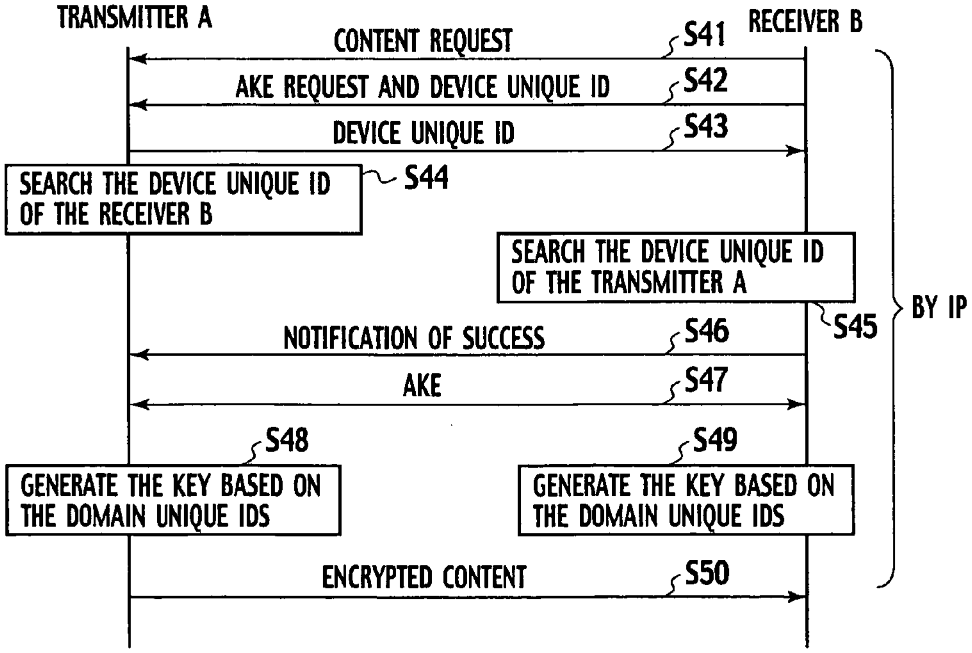
FIG. 14 is a sequence diagram illustrating an example of an operational sequence of executing content transmission operations using the device unique ID.

FIG. 14 is a sequence diagram illustrating an example of an operational sequence of the content transmission operations based on the device unique ID. First, the receiver B transmits a content request to the transmitter A (step S41). The receiver B transmits the device unique ID of the receiver B and an authentication and key exchange (AKE) request to the transmitter A (step S42). The transmitter A transmits the device unique ID of the transmitter A to the receiver B in response to the content request received from the receiver B (step S43) and searches the domain unique ID corresponding to the device unique ID of the receiver B from the domain ID list of the transmitter A (step S44).

Likewise, the receiver B searches the domain unique ID corresponding to the device unique ID of the receiver A from the domain ID list of the transmitter B (step S45). If at least one of the transmitter A and the receiver B is successful in searching, the receiver B transmits a message to the transmitter A to notify the success in searching. This example shows a case wherein the domain ID list of the receiver B contains the domain unique ID of the transmitter A, and the receiver B sends a notification of the success in the check operation to the transmitter A (step S46).

The transmitter A and the receiver B mutually execute the AKE processing for the purpose of verifying whether they are legitimate units that are licensed (step S47). The transmitter A generates a key for encrypting content based on the domain unique ID corresponding to the device unique ID of the receiver B and the domain unique ID of the transmitter A (step S48). The receiver B generates a key for decrypting content based on the domain unique ID corresponding to the device unique ID of the receiver A and the domain unique ID of the transmitter B (step S49). Upon success in the AKE operation and in generating the key, the transmitter A encrypts content for transmission to the receiver B (step S50). In the communication set forth above, content may be transmitted or received as a packet in a network layer in compliance with IP (Internet Protocol) or as a frame in a data link layer.

Modified Form 2 of the First Embodiment

Figure 15:
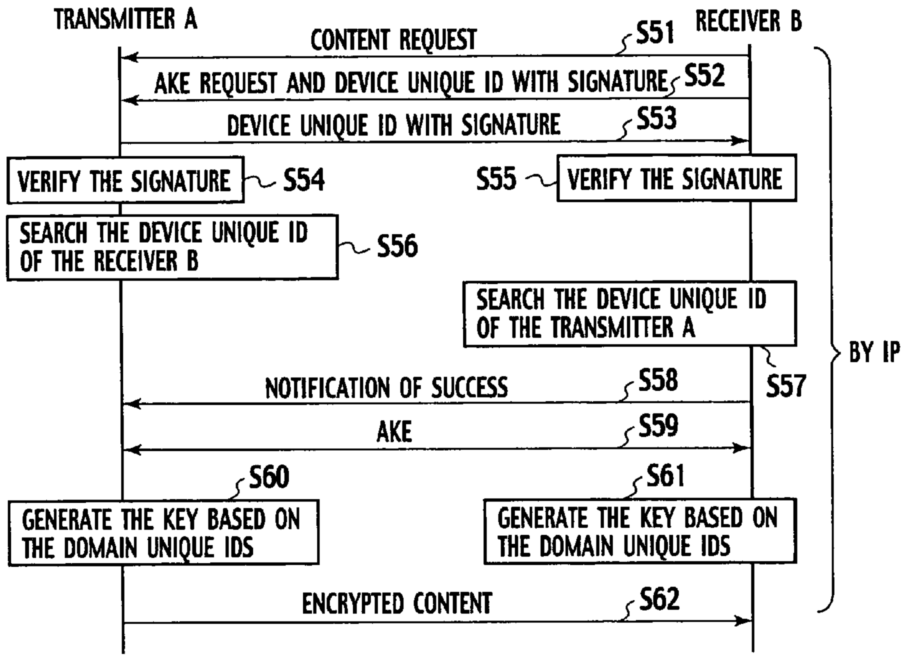
FIG. 15 is a sequence diagram illustrating an example of an operational sequence which includes operations to check the device unique ID and to verify a signature.

Although no signature is verified in the operations shown in FIG. 14, the checking of the device unique ID and the verification of the signature may be carried out in combination. A sequence of operations in such a case is exemplified as shown in FIG. 15

First, the receiver B transmits a content request to the transmitter A (step S51). Upon receipt of this request, the transmitter A and the receiver B mutually execute the AKE processing for verifying whether they are legitimate units that are licensed (step S52). In the AKE processing, the transmitter A and the receiver B exchange a public key according to a public key cryptography such as ISO/IEC 9798-3. The device unique ID is also transmitted together with the public key (step S53). The public key is assigned with a signature, which is issued by the License Organization, and the device unique IDs are also assigned with signatures.

The transmitter A and the receiver B verify the signatures, respectively, (steps S54, S55) and if the signatures are found to be correct, then, the transmitter A searches the domain unique ID corresponding to the device unique ID of the receiver B, from the domain ID list obtained in the ID registering operation (step S56). The operations are executed in the same manner as those of the operations shown in FIG. 14 (steps S57 to S59). The transmitter A and the receiver B respectively generate a key using the searched domain unique ID and their own domain unique ID for encrypting content (steps S60, S61). Upon success in the AKE processing and in generating the key, the transmitter A encrypts content for transmission to the receiver B (step S62).

The device unique ID, set forth above, is available to be transmitted on a plain text. Since the device unique ID is contained in the certificate in the process shown in FIG. 15, even if the device unique ID is wiretapped, a legitimate key for decrypting content can not be generated because the legitimate key is generated using the domain unique ID, which is registered only through the ID registering operations, instead of the device unique ID. Also, even if the device unique ID is altered in the middle of communication, the legitimate key for decrypting content can not be generated because the legitimate key is generated using the domain unique ID.

With the first embodiment, the transmitter A and the receiver B uses the domain unique ID so as to generate the key for encryption and decryption of content. The transmitter A and the receiver B may use the domain unique ID to generate message authentication code (MAC), and exchange the MAC to check whether at least one of the transmitter A and the receiver B has a domain unique ID of the other, which has already registered with the short-range radio unit E. A MAC algorism may include a well-known method such as SHA-1.

After receiving notification of success (S46, S58), both the transmitter A and the receiver B calculate the same MAC value using the domain unique ID. Random number may include the MAC calculation. The transmitter A and the receiver B exchange a part of MAC value. First, the transmitter A sends the message which include the most significant N bit of MAC. Upon receipt of this message, the receiver B checks the received N bit corresponds with the MAC value which the receiver B calculates using the domain unique ID. If the check is successful, the receiver B sends least significant M bit of MAC value. Upon receipt of this message, the transmitter A checks the received M bit of MAC corresponds with the MAC value which the transmitter A calculates using the domain unique ID. If these checks are successful, the transmitter A encrypts content using the key generated in the AKE processing for transmission to the receiver B.

With the first embodiment, as set forth above, transmitting and receiving content follow checking whether at least one of the transmitter A and the receiver B has a domain unique ID of the other, which has already registered with the short-range radio unit E. Since the short-range radio unit E can communicate with the transmitter A and the receiver B within short distances, it may be available for the transmitter A and the receiver B to limit a condition of communication to a certain duration of communication with the short-ranger radio unit E or a certain range for the short-range radio unit E. This precludes the transmitter A and the receiver B from being connected in endless communication and it becomes possible content, needed for copyright protection, to be utilized within a range for private use.

Second Embodiment

In a second embodiment, the transmitter A and the receiver B, which do not have a shared domain unique ID, achieve communication with one another via a bridge device.

Figure 16:
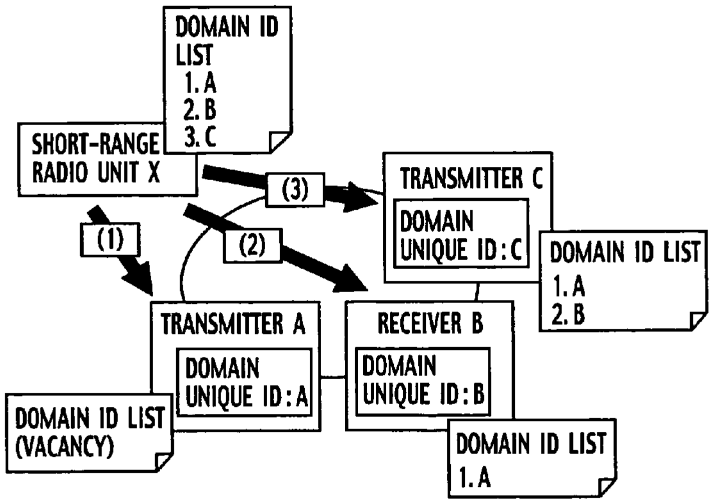
FIG. 16 is a block diagram illustrating an overall structure of a second embodiment.

FIG. 16 is a block diagram illustrating an overall structure of an information-processing device of a second embodiment according to the present invention. The information-processing unit shown in FIG. 16, includes the transmitters A, C and the receiver B that are operative to communicate with a short-range radio unit X. The transmitters A, C may be configured to have the same structure as that shown in FIG. 3; the receiver B may be configured to have the same structure as that shown in FIG. 3; and the short-range radio unit X may be configured to have the same structure as that of FIG. 5. Suppose that values of the domain IDs of the transmitters A, C are assigned to be "A", "C", respectively, and a value of the domain unique ID of the receiver B is assigned to be "B".

Under an initial state, suppose that nothing is registered in the domain ID list of the short-range radio unit X. As shown in FIG. 16, first, the short-range radio unit X executes ID registering operations for the transmitter A, the transmitter B and the receiver C in that order. As a result, the domain unique ID of the transmitter A is registered in the domain ID list of the receiver B; the domain unique IDs of transmitter A and the receiver B are registered in the domain ID list of the transmitter C; and the domain unique IDs of the transmitter A, the receiver B and the transmitter C are registered in the domain ID list of the short range radio unit X. That is, the transmitter A remains under a condition available for content to be transmitted to the receiver B and the transmitter C. The status set forth above is illustrated in FIG. 16.

Figure 17:
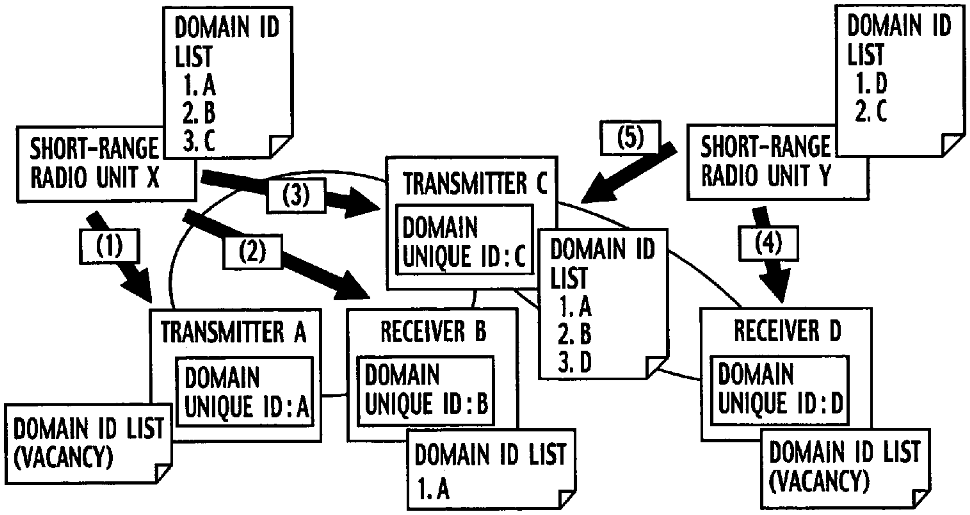
FIG. 17 is a view illustrating an example in which using a short-range radio unit, ID registering operation is executed in a receiver and a transmitter in this order.

Under such a condition, as shown in FIG. 17, the ID registering operation is executed in a receiver D and the transmitter C in that order using a short-range radio unit Y. As a result, a domain unique ID of the receiver D is registered in the domain ID list of the transmitter C together with the domain unique IDs of the transmitter A and the receiver B that have been registered. The domain unique IDs of the receiver D and transmitter C are registered in the domain ID list of the short-range radio unit X. The status so far is illustrated in FIG. 17.

According to this situation described in FIG. 17, the receiver D is not available to receive content from the transmitter A Even though all the communication units do not have a shared domain unique ID using the short-range radio unit X, all the communication units can communicate with one another using the other short-range radio unit than the short-range radio unit X so as to form a group.

According to the second embodiment, the bridge device unit, which has domain unique IDs of both the transmitter A and the receiver D, intervenes between the transmitter A and the receiver D so as to make transmission of content between the two communication units which do not have domain unique ID of each other. Furthermore, managing a registration status of the domain unique IDs among all the communication units, all the communication units can communicate with one another even though they have a different domain unique ID.

Figure 18:
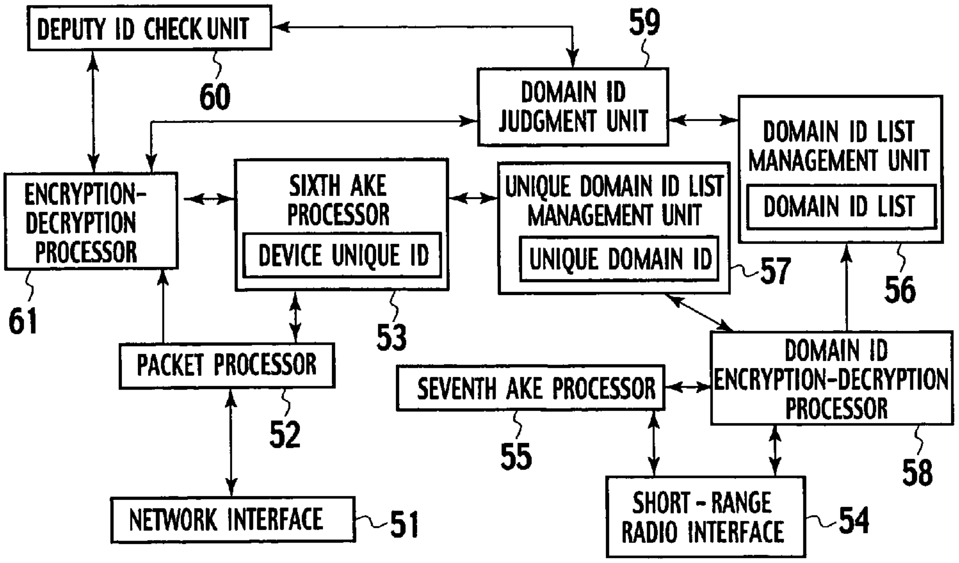
FIG. 18 is a block diagram showing an example of an internal structure of a bridge device.

FIG. 18 is a block diagram illustrating an example of an internal structure of the bridge device. The bridge device may be a transmitter or a receiver and may be an intermediary device, merely serving as the bridge device, to execute only the authenticating operation between the transmitter and the receiver. Hereinafter, a function of the intermediary device is described.

The bridge device, shown in FIG. 18, includes a network interface 51, a packet processor 52, a sixth AKE processor 53, a short-range radio interface 54, a seventh AKE processor 55, a domain ID list management unit 56, a domain unique ID management unit 57, a domain ID encryption-decryption processor 58, a domain ID judgment unit 59, an ID check unit 60 and an encryption-decryption processor 61. Except for the ID check unit 60 being provided, the bridge device includes substantially the same structure as those of the transmitter A shown in FIG. 10 and the receiver B shown in FIG. 11.

The ID check unit 60 executes search operation to determine whether device unique IDs of both the transmitter and the receiver, inputted from the network interface 51, are registered in the domain ID list of the bridge device. The operation is continued, only when both the device unique IDs are registered, to permit the AKE processing to be executed. If both of the device unique IDs are not registered, the AKE operation is rejected and error operation is conducted.

Figure 19:
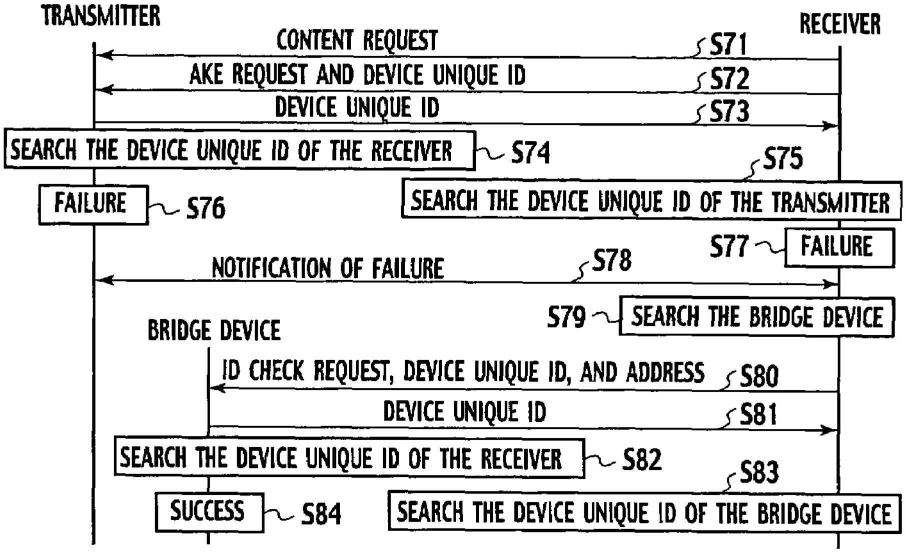
FIG. 19 is a sequence diagram illustrating an operational sequence of executing content transmission operations to allow the transmitter and the receiver to communicate with each other through a bridge device.

FIG. 19 is a sequence diagram illustrating an operational sequence of the content transmission operations, in which the transmitter A and the receiver D communicate via the bridge device. The bridge device, the transmitter and the receiver have both of the device unique IDs and the domain unique IDs. That is, each communication unit includes the domain ID list of the form shown in FIG. 12. In the ID registering operation, each communication unit receives both of the device unique IDs and the domain unique IDs from the short-range radio unit so as to add both of the device unique IDs and the domain unique IDs to the domain ID list. In the content transmission operations, as shown in FIGS. 14 and 15, the check operation to be executed to find whether an ID of the communication unit is registered.

The transmitter, the receiver and the bridge device shown in FIG. 19 correspond to the transmitter A, the receiver D and the transmitter C shown in FIG. 16, respectively. That is, the transmitter C has the device unique IDs of the transmitter A and the receiver D in the domain ID list. The transmitter A and the receiver D do not have the device unique IDs of each other.

In the communication set forth below, content may be transmitted or received as a packet in a network layer in compliance with IP (Internet Protocol) or as a frame in a data link layer in compliance with Ethernet (registered Trade Mark). Here, description is made of a case wherein the IP is used.

First, the receiver sends a content request to the transmitter (step S71) and, consecutively, transmits an AKE request and a device unique ID (step S72). Upon receipt of the AKE request and the device unique ID, the transmitter transmits the device unique ID of the transmitter to the receiver (step S73). The transmitter and the receiver search the same device unique ID registered in the domain ID list as the received device unique ID (steps S74, S75). In this case, neither the transmitter nor the receiver has the device unique ID of each other and the search operation results in a failure (steps S76 to S78).

Next, the receiver searches the bridge device that has the device unique ID of the transmitter (step S79). If the search operation is successful, an ID check request, a device unique ID of the receiver and an address of the transmitter are transmitted to the relevant bridge device (step S80). The ID check request is a message asking the bridge device, having the device unique IDs of both the transmitter and the receiver, to execute the ID check processing with the transmitter for receiving a check result sent back. The term "address of the transmitter" refers to an IP address of the transmitter in this case.

Upon receipt of the ID check request, the bridge device transmits the device unique ID of the bridge device to the receiver (step S81). The bridge device and the receiver search the device unique IDs, which are respectively received, are registered in the domain ID list (steps S82, S83). Since the transmitter C serving as the bridge device has the device unique ID of the receiver D in the domain ID list, the ID check processing is successfully executed (step S84) and the transmitter C transmits a message, notifying the success and acknowledgement of the ID check request (step S85).

Figure 20:
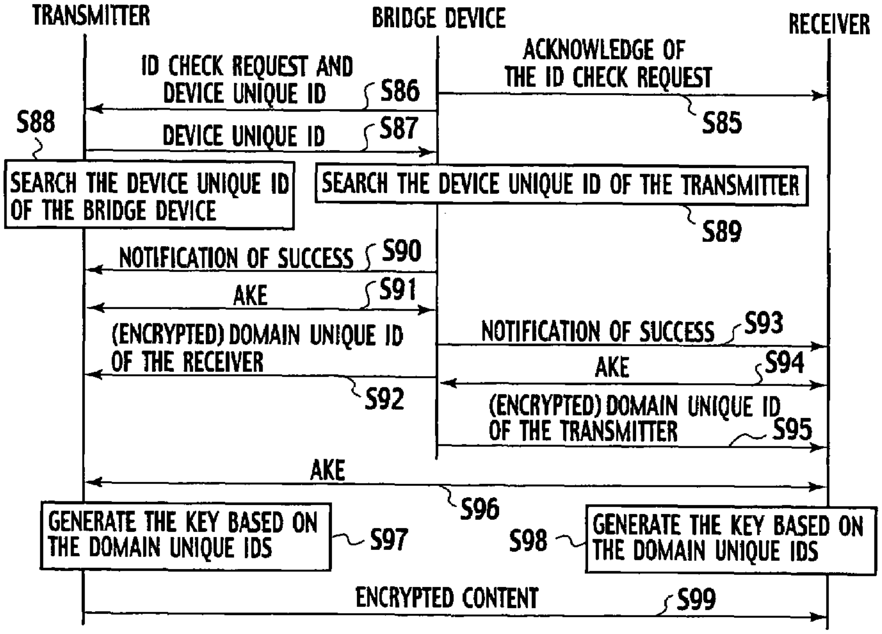
FIG. 20 is a sequence diagram showing operations following the operations shown in FIG. 19.

As shown in FIG. 20, upon acknowledgement of the ID check request, the bridge device transmits the ID check request and the device unique ID of the bridge device to the transmitter (step S86). Upon receipt of the ID check request, the transmitter transmits the device unique ID of the transmitter to the bridge device (step S87).

The transmitter and the bridge device search the device unique IDs, which are respectively received, are registered in the domain ID list (steps S88, S89). Since the bridge device has the device unique ID of the transmitter in the domain ID list, the search operation is successful (step S90) and the bridge device sends a notification of the success. The bridge device and the transmitter execute the AKE processing (step S91). In this event, the key is generated using the domain unique IDs of both of the transmitter and the bridge device. Using this key, the encrypted domain unique ID of the receiver is transmitted to the transmitter (step S92). The bridge device sends a notification of the success in the ID check processing to the receiver (step S93) and executes the AKE processing (step S94). In this event, the key is generated using the domain unique IDs of both the bridge device and the receiver. Using this key, the encrypted domain unique ID of the transmitter is transmitted to the receiver (step S95).

With the sequence set forth above, the transmitter and the receiver are able to acquire the domain unique ID of each other. Subsequently, the transmitter and the receiver execute the AKE processing to verify whether the transmitter and the receiver are legitimate units that are licensed (step S96). Using the domain unique IDs of both of the transmitter and the receiver, a key is generated for encrypting content (steps S97, S98). The content, which is encrypted using the key, is transmitted from the transmitter to the receiver (step S99).

The AKE processing between the bridge device and the receiver may precede the AKE processing between the transmitter and the bridge device after the acknowledgement of the ID check request.

Modified Form 1 of the Second Embodiment

Figure 21:
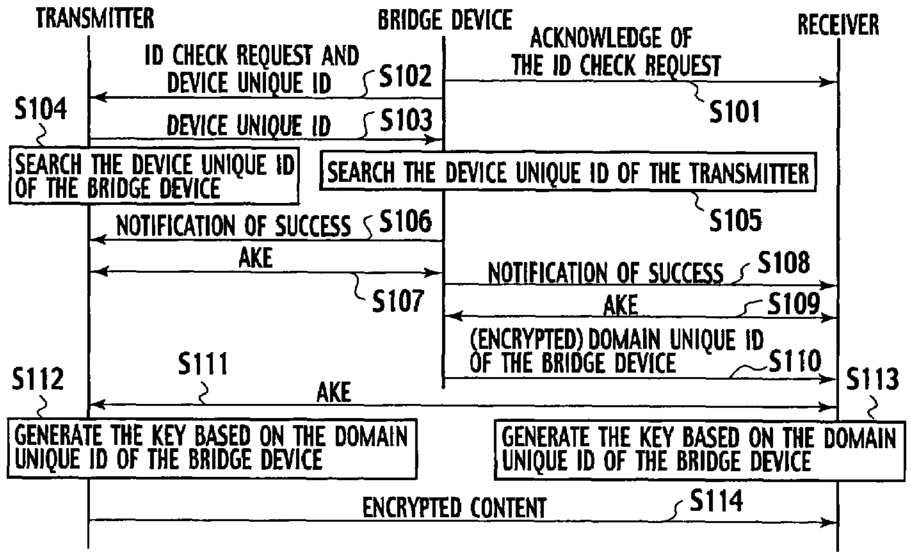
FIG. 21 is a sequence diagram illustrating a modified form of the sequence shown in FIG. 20.

The key for encrypting the content may be generated using the domain unique ID of the bridge device instead of the domain unique ID of the transmitter or the receiver as shown in FIGS. 19 and 20. In this case, an operational sequence is shown in FIG. 21. The operations shown in FIG. 21 follows steps S71 to S84 shown in FIG. 19. The operations up to the AKE processing (steps S107, S109) are identical to those of the steps in FIG. 20. Although in the steps shown in FIG. 20, the bridge device intervenes between the transmitter and the receiver for exchanging their domain unique IDs, in FIG. 21, the domain unique ID of the bridge device is transmitted to the receiver (step S110).

Upon executing the operations set forth above, both of the transmitter and the receiver have the domain unique ID of the bridge device. Then, the transmitter and the receiver execute the AKE processing to verify whether they are the legitimate units that are licensed (step S111). Using the domain unique ID of the bridge device, the key is generated for encrypting content (steps S112, S113).

Modified Form 2 of the Second Embodiment

In the case where the bridge device X does not have the device unique ID of the transmitter with which the receiver requests to communicate, the bridge device may transmit the ID check request to another bridge device Y that has the device unique ID of the transmitter. The bridge device X executes the same operations as those of the steps in FIGS. 20 and 21, and the bridge device Y executes the same operations as those of the bridge device X. The transmitter and the receiver finally have the domain unique IDs of each other to generate a key for encrypting content.

Figure 22:
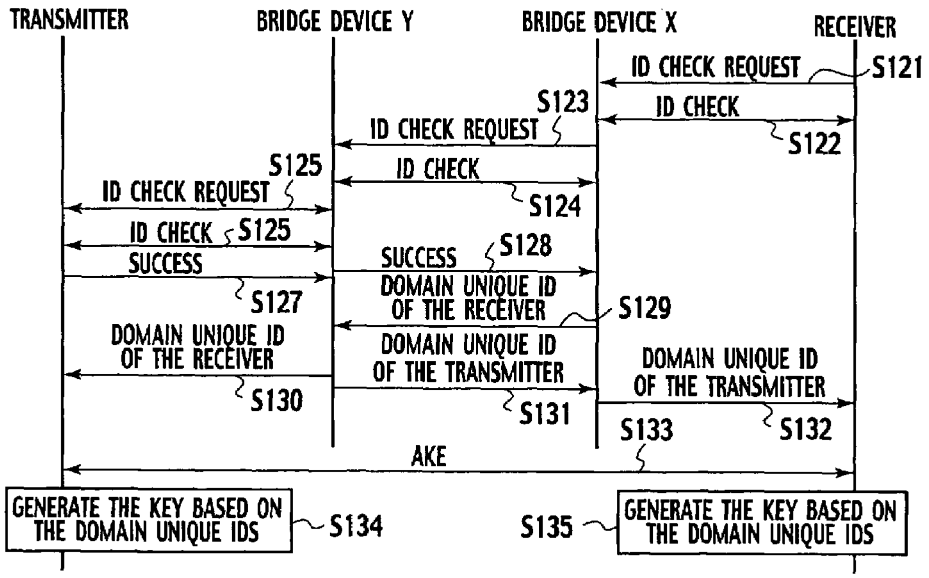
FIG. 22 is a sequence diagram showing an example of an operational sequence in which two bridge devices are relayed between the transmitter and the receiver.

FIG. 22 is a sequence diagram illustrating an example of an operational sequence of a structure wherein two bridge devices X, Y relay each other between the transmitter and the receiver. For the sake of simplicity of description, the operations shown in FIGS. 20 and 21 are illustrated in FIG. 22 in a simplified form. The receiver transmits the ID check request and the device unique ID of the receiver to the bridge device X (steps S121) The bridge device X and the receiver execute the ID check processing (S122).

In this embodiment, since the bridge device X does not have the device unique ID of the transmitter in the domain ID list, the bridge device X is unable to transmit the ID check request to the transmitter. Therefore, the bridge device X transmits the ID check request to the bridge device Y that has the device unique ID of the transmitter (steps S123). The bridge device Y and the transmitter execute the ID check processing (S124).

Since the bridge device Y has the device unique ID of the transmitter, the bridge device Y transmits the ID check request and the device unique ID of the bridge device Y to the transmitter (steps S125). The bridge device Y and the transmitter execute the ID check processing (S126). The ID check processing is successfully executed between the transmitter and the bridge device Y (steps S127, S128). Subsequently, the bridge device Y encrypts the domain unique ID of the receiver for transmission to the transmitter (steps S129, S130). The encrypted domain unique ID of the transmitter is sent to the bridge device X from the bridge device Y (step S131). Upon receipt of the domain unique ID of the transmitter, the bridge device X transmits the domain unique ID of the transmitter to the receiver (step S132).

The transmitter and the receiver have the domain unique ID of each other. Therefore, the transmitter and the receiver can generate the shared key using the shared domain unique ID for encrypting content (steps S133 to S135).

In step S121 in FIG. 22, operations to search the bridge device Y having the device unique ID of the transmitter are described below. A operation includes a process in which the bridge device within the same subnet is searched using a broadcast IP address (Example 1). Another operation includes a process in which search request is transmitted to communication units whose domain unique ID is registered in the domain ID lists of the receiver (Example 2). Still another operation includes a process in which each communication unit has a relational table for the device unique IDs (Example 3). A combination out of any of the Example 1, the Example 2, and the Example 3 may be allowed.

In the Example 1 wherein the bridge device is searched within the same subnet using the broadcast IP address, a message of the ID check request is transmitted with the broadcast IP address. Receiving this message, the other communication unit in the same subnet searches the device unique ID of the transmitter in the other communication unit. If the device unique ID of the transmitter is found in the domain ID list, a notification of the find is sent to the receiver that transmitted the search request. If the device unique ID of the transmitter does not exist in the same subnet but another subnet, the ID check request is transferred to another subnet. In this case, in order to prevent a message of the ID check request from being looped, it may be possible to restrict the number of subnets to which the ID check request is transferred.

Since the broadcast address is an address that is effective only within a subnet, the search area may be limited to a range within the subnet.

In the Example 2 wherein the search request is transmitted to the communication units whose domain unique ID is registered in the domain ID lists of the receiver, the ID check request is transmitted to only the communication units that is registered in the domain ID list.

In the Example 3, wherein the each communication unit has the relational table for the device unique IDs, is described below. In the Example 3 above-mentioned, the each communication unit has a table (device unique ID table) registered in the each communication unit as shown in FIG. 23. The device unique ID table includes data indicating relationship among the communication units sharing a unique identification. In this table, the communication unit, whose device unique ID is "AA", has the device unique IDs "XX" and "BB" registered in the domain ID list.

That is, the communication unit, whose device unique ID is "AA", successfully executes the ID check processing with the other communication units whose device unique IDs are "XX" and "BB", respectively. Similarly, another communication unit, whose device unique ID is "XX" successfully executes the ID check processing with the other communication unit whose device unique ID is "ZZ".

FIG. 24 is a view illustrating respective communication units having the domain unique IDs and the domain ID lists. The receiver Y whose device unique ID is "YY" has the device unique ID of "AA" in the domain ID list. The receiver Y has the table shown in FIG. 23. The transmitter A and transmitter X serving as bridge devices intervene between the receiver Y and the transmitter Z to execute the ID check processing so that the transmitter Z can transmit content to receiver Y.

Figure 26:
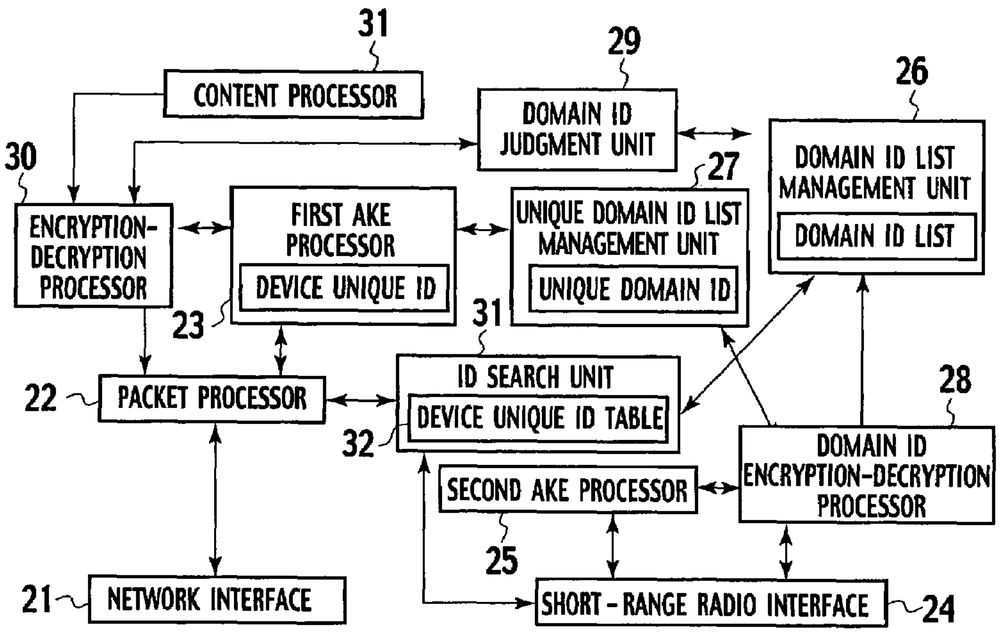
FIG. 26 is a block diagram illustrating an example of an internal structure of the receiver provided with the device unique ID table.

FIG. 25 is a block diagram illustrating an example of an internal structure of the transmitter A that has the device unique ID table. FIG. 26 is a block diagram illustrating an example of an internal structure of the receiver Y that similarly has the device unique ID table.

The transmitter A, shown in FIG. 25, includes, in addition to the structure shown in FIG. 10, an ID search unit 12 has a device unique ID table 13. Further, the receiver Y, shown in FIG. 26, includes, in addition to the structure shown in FIG. 11, an ID search unit 31 has the device unique ID table 13. The ID search units 12, 31 search the bridge device intervening between the transmitter and the receiver based on the device unique ID tables obtained from the short-range radio interfaces 4, 24 or from the network interfaces 1, 21 so as to establish communication path between the transmitter and the receiver.

This embodiment is particularly useful in cases where the receiver needs to execute the ID check processing with the transmitter via the bridge device and the device unique ID of the transmitter device is not registered in the bridge device but the device unique ID of the bridge device is registered in the transmitter.

In FIG. 24, the receiver Y is able to communicate with the transmitter B through the transmitter A serving as the bridge device because the receiver Y has the device unique ID "AA" of the transmitter A; the transmitter B has the device unique ID "AA" of the transmitter A.

The receiver Y transmits a message for the ID check request to the transmitter A serving as the bridge device. Because the transmitter A does not have the device unique ID of the transmitter B in the domain ID list, even though the transmitter executes the search operation based on the device unique ID table indicating that the receiver Y can communicate with any transmitter via the transmitter A, this search operation may fail.

Because the device unique IDs do not need to be kept in secret, also information for a relationship of the device unique IDs exchanged among the communication units does not need to be kept in secret. Each communication unit searches the bridge device based on the device unique ID tables indicating the relationship of the device unique ID so as to transmit the ID check request for achieving the communication path. The device unique ID table may be distributed to the short-range radio units or stored in a server in a network, such as a server located in a home network, to allow the each communication unit to acquire the device unique ID tables at arbitrary timings.

Modified Form 3 of the Second Embodiment

Figure 27:
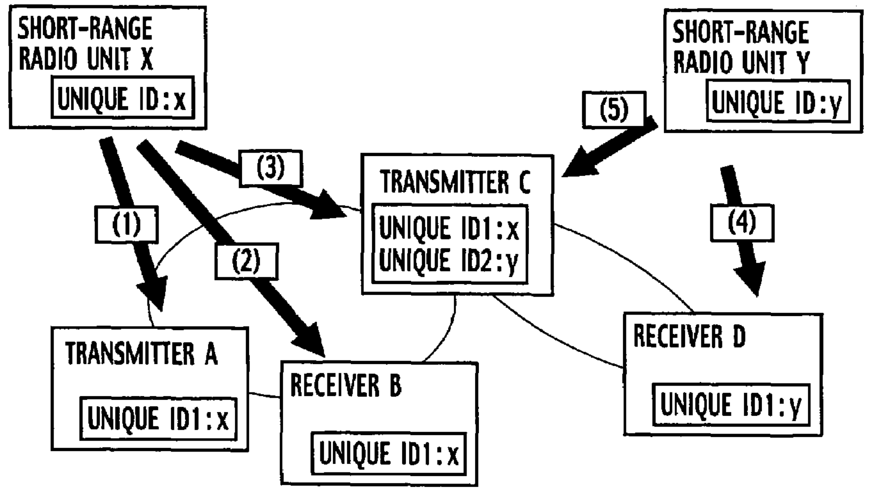
FIG. 27 is a view illustrating a unique ID registering method of the second embodiment.

FIG. 27 is a view illustrating a unique ID registering method different from that of the first embodiment. In FIG. 27, a unique ID is allocated to each of the short-range radio units X, Y, respectively. In an ID registering operation, the unique ID is registered in the respective receivers and transmitters. In content transmission operations, a check operation is executed to determine whether the registered unique ID coincides with the received unique ID.

Figure 28:
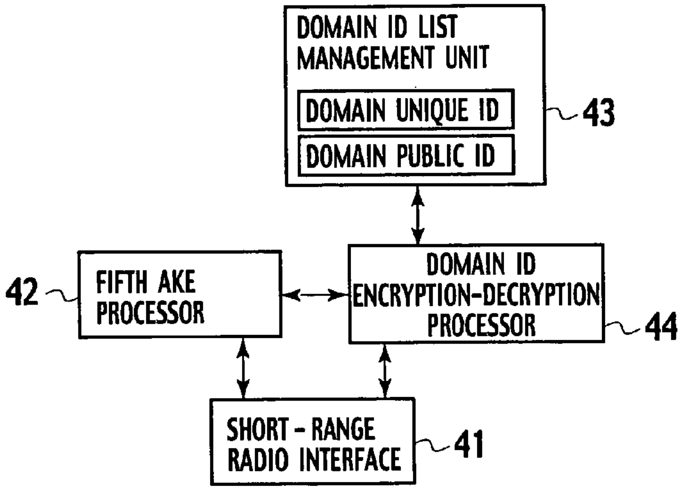
FIG. 28 is a block diagram illustrating an example of an internal structure of an each of the short-range radio units to be used in a registering method shown in FIG. 27.

FIG. 28 is a block diagram illustrating an example of an internal structure of each of the short-range radio units X, Y to be used in the registering method shown in FIG. 27. The short-range radio units X, Y are similar to those of FIG. 5, except that the short-range radio units X, Y have a domain unique ID and a domain public ID instead of the domain ID lists. The domain unique ID and the domain public ID take non-rewritable values which are uniquely allocated to the respective short-range radio units. Particularly, the domain unique ID may be preferably protected from being retrieved or tampered by the other units. The domain unique ID and domain public ID are managed by a domain ID list management unit 43 shown in FIG. 28.

Figure 29:
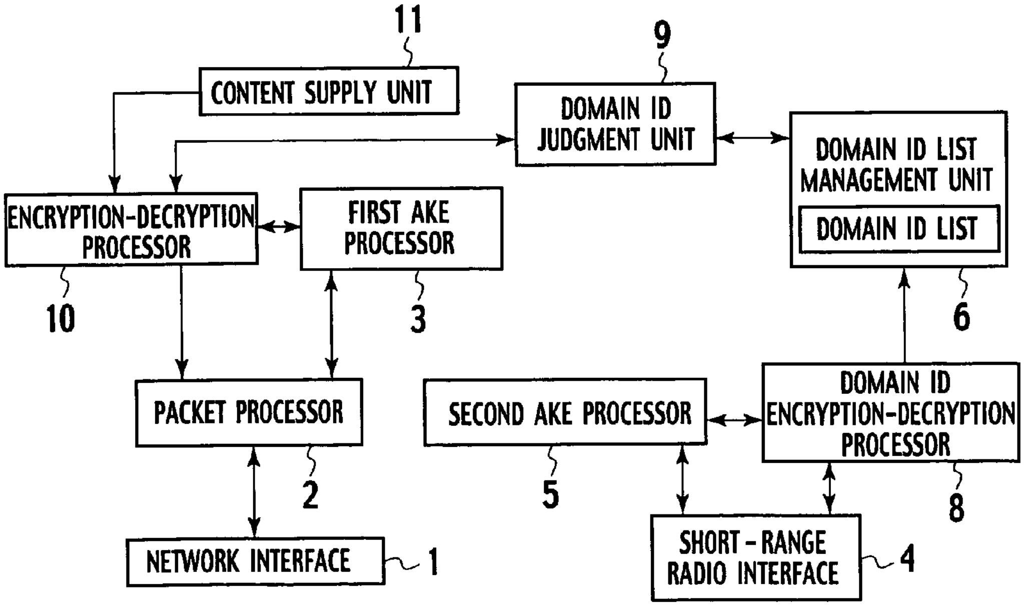
FIG. 29 is a block diagram illustrating an example of an internal structure of the transmitter to be used in the registering method shown in FIG. 27.

FIG. 29 is a block diagram illustrating an example of an internal structure of the transmitter A to be used in the registering method shown in FIG. 27. The transmitter A, shown in FIG. 29, is similar to the transmitter A shown in FIG. 10, except that a domain unique ID management unit, a domain unique ID, and a device unique ID do not exist in the structure shown in FIG. 29.

Figure 30:
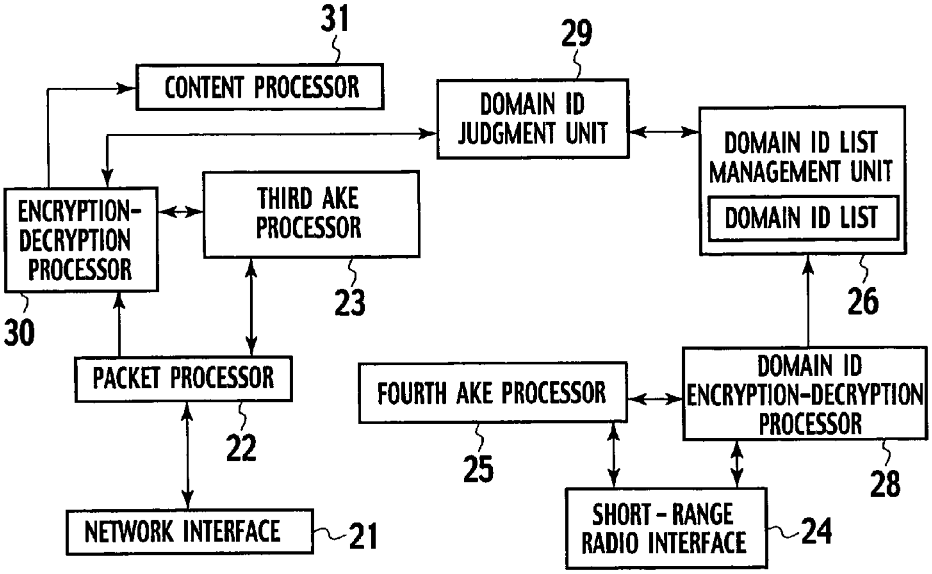
FIG. 30 is a block diagram illustrating an example of an internal structure of the receiver to be used in the registering method shown in FIG. 27.

FIG. 30 is a block diagram illustrating an example of an internal structure of the receiver B in the registering method shown in FIG. 27. The receiver B, shown in FIG. 30, is similar to the receiver B of FIG. 11, except that there are not a domain unique ID management unit and IDs, such as the domain unique ID and the unique ID, which are uniquely allocated to the receiver in FIG. 30.

Figure 31:
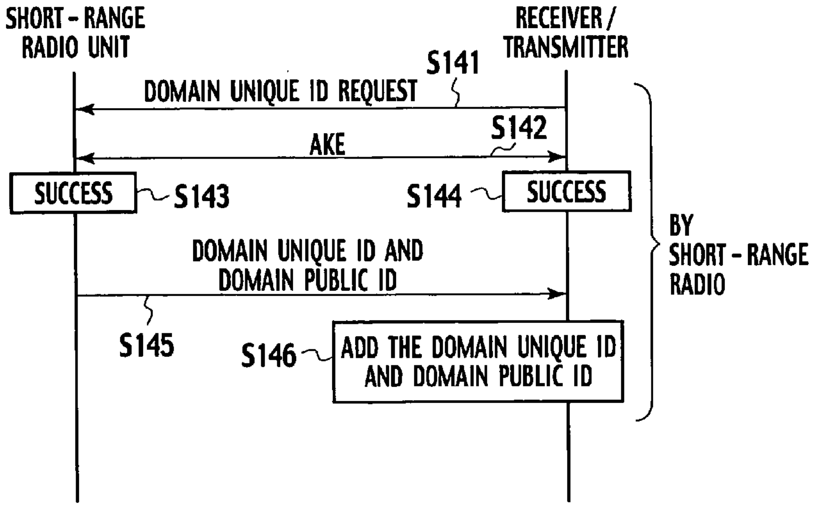
FIG. 31 is a sequence diagram showing an example of an operational sequence to execute ID registering operation in the ID registering method shown in FIG. 27.

FIG. 31 is a sequence diagram illustrating an example of an operational sequence of ID registering operation in the ID registering method shown in FIG. 27. First, the transmitter A transmits a domain unique ID request to the short-range radio unit X (step S141). Upon transmitting the domain unique ID request, the transmitter A and the short-range radio unit X mutually execute AKE processing to determine whether they are legitimate units (step S142).

If the authentication is failed, given error operation is executed and no subsequent operations proceeds. With the authentications succeeded (steps S143, S144), the short-range radio unit X transmits a domain unique ID and a domain public ID of the short-range radio unit X to the transmitter A (step S145). Upon receipt of the domain unique ID and the domain public ID, the transmitter A adds these IDs in the domain ID list (step S146). Also, the domain ID list may be preferably protected form tampering illegitimately.

While in FIG. 31, the domain unique ID request is transmitted from the transmitter A to the short-range radio unit X, on the contrary, the domain unique ID request may be transmitted from the short-range radio unit X to the transmitter A to begin the AKE processing. A series of these operations are executed with short-range radio through the short-range radio interfaces provided with the transmitter A, the receiver B and the short-range radio unit X.

The operations for registering the domain unique ID and the domain public ID in the transmitter are similar to the operations for registering to the receiver. In FIG. 27, the domain public ID "x" and the domain unique ID "xx" of the short-range radio unit X are registered in the transmitter A, the receiver B and the transmitter C. The domain public ID "y" and the domain unique ID "yy" of the short-range radio unit Y are registered in the transmitter C and the receiver D.

According to this embodiment, even though the IDs registered in the domain ID lists of the transmitter A and the receiver B do not correspond to the receiver D, the transmitter A and the receiver B achieve a communication path with the receiver D for content transmission. The transmitter C, in which both of the short-range radio units X and Y are registered, serves as a bridge device and intervenes between the transmitter A and the receiver D and between the receiver B and the receiver D with the same system as that has been described in the second embodiment.

Figure 32:
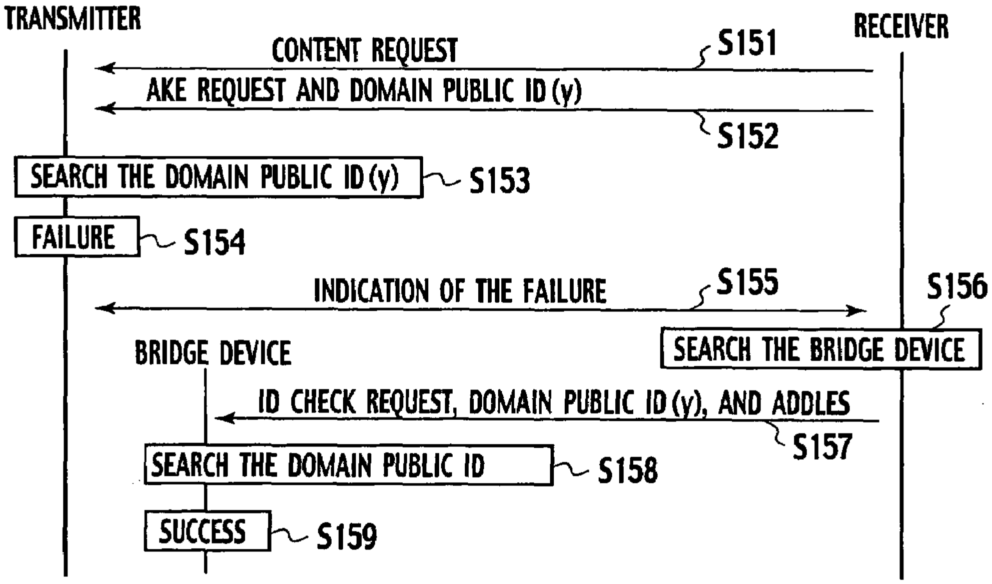
FIG. 32 is a sequence diagram showing an operational sequence to execute AV communication processing in which the transmitter and the receiver communicate with each other through the bridge device.
Figure 33:
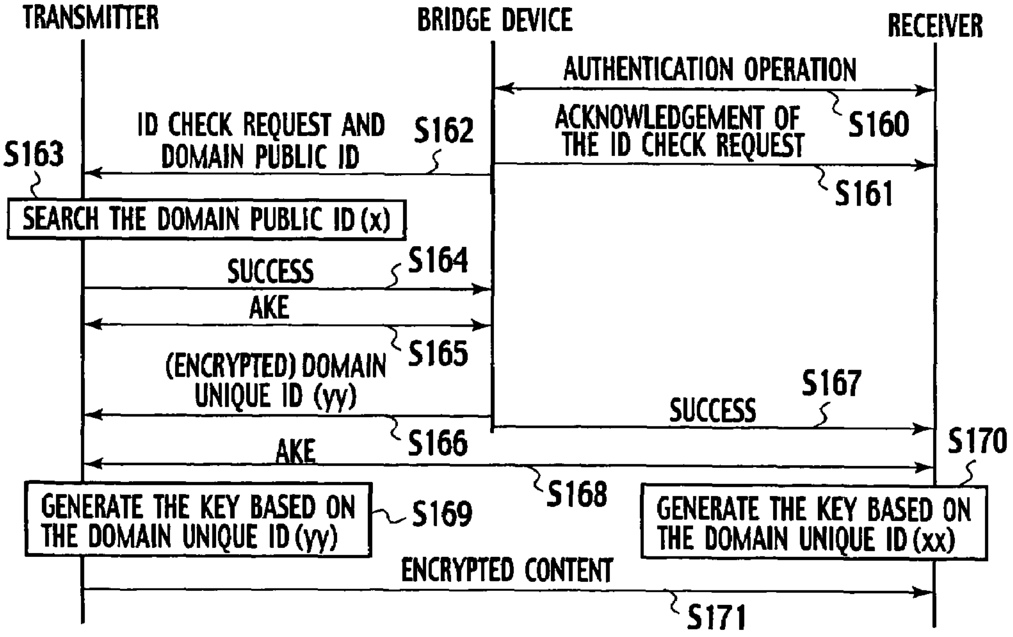
FIG. 33 is a sequence diagram showing operations following the operations shown in FIG. 32.

FIGS. 32 and 33 are sequence diagrams illustrating operational sequences of executing AV communication processing to be executed by the transmitter and the receiver through the bridge device under a condition shown in FIG. 27. In the communication processing described below, content may be transmitted and received as a packet in the network layer such as IP (Internet Protocol) or may be transmitted and received as a frame in the data link layer such as Ethernet (Registered Trade Mark). Here, description is made of a case using the IP.

First, the receiver transmits a content request to the transmitter (step S151) and, consecutively, transmits an AKE request and the domain public ID "y" of the short-range radio unit Y that is registered in the receiver (step S152). Upon receipt of these, the transmitter executes search operation to determine whether the domain public ID "y" is registered in the domain ID list of the transmitter (step S153). In the case where the transmitter does not have the domain public ID "y" because of not having registered in the domain ID list of the transmitter, the transmitter fails in the search operation (steps S154, S155).

The receiver searches a bridge device that has the domain public ID of the transmitter (step S156). If the search is successful, the receiver transmits an ID check request, a domain public ID registered in the domain ID list of the receiver, and an address of the transmitter (step S157). The ID check request is a message that requests the bridge device, which has the domain public IDs of both of the transmitter and the receiver, to execute the ID check processing with the transmitter for receiving a check result sent back. The term "address of the transmitter" refers to an IP address of the transmitter.

Upon receipt of the ID check request, the bridge device executes the search operation to determine whether the received domain public ID "y" is registered in the domain ID list (step S158). In this case, since the transmitter C, serving as the bridge device, has the domain ID list registered with the domain public ID "y" of the short-range radio unit Y, the search operation is successfully executed (step S159). The bridge device and the receiver execute the authenticating operation, respectively, so as to confirm whether the bridge device and the receiver are legitimate units that are licensed (step S160). If the authenticating operation is executed in success, the bridge device transmits a message to the receiver for informing that the ID check request is acknowledged (step S161).

The bridge device requests the transmitter to execute the ID check processing and transmits the domain public ID to the transmitter (step S162). Then, the transmitter executes the search operation to find whether the domain public ID "x", which is received from the bridge device, is registered in the domain ID list (step S163). In this event, since the transmitter has the domain public ID "x" registered in the domain ID list using the short-range radio unit X through the registering operation, the search operation is successfully executed to send a notification of the success of the search operation (step S164). The bridge device and the transmitter execute AKE processing (step S165) and if the authentication is successfully executed, the bridge device transmits the domain unique ID "xx", which is encrypted using the domain unique ID "yy", to the transmitter (step S166). The bridge device notifies the receiver with information for a success in the ID check processing (step S167).

With the sequence set forth above, the transmitter and the receiver are enabled to have the shared domain unique ID "yy". Then, the transmitter and the receiver mutually execute the authenticating operation to verify whether the transmitter and the receiver are legitimate units that are licensed (step S168) and generate a key to encrypt content using the domain unique ID "yy" (steps S169, S170). The encrypted content is transmitted from the transmitter to the receiver (step S171).

As set forth above, in the second embodiment, even if the different short-range radio units register mutually different unique IDs in the communication units through ID registering operations, the transmitter and the receiver, both of which do not have mutually device unique IDs, are able to communicate via the bridge device that has the device unique IDs of both of the transmitter and the receiver so as to achieve the communication path for transmitting the encrypted content under copyright protection.

According to the second embodiment, a user can use any short-range radio units for registering the unique IDs and a user does not have to memorize relationship between the unique IDs of the short-range radio unit and the communication units. Consequently, easy-to-use operation of the short-range radio units for the user is improved.

Although, the content transmission operations are executed via the bridge device, the encrypted content may be transmitted from the transmitter to the receiver through any communication path instead of through the bridge device. Transmitted not through the bridge device, the content does not have to be re-encrypted at the bridge device. The structure of the bridge device becomes simple.

Any ID registering methods, including the ID registering operation mentioned in the first embodiment, are applicable to the second embodiment. In the first embodiment, the transmitter and the receiver lo additionally register the unique IDs using the short-range radio units. According to the second embodiment, the transmitter and the receiver can communicate with each other via the bridge device even though the receiver, which has different unique ID from that of the transmitter, belongs to the different domain from that of the transmitter.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. An information-processing device comprising:

a first interface configured to transmit content to a first communication unit through a network;

a second interface for a short-range communication and configured to receive a first unique identification allocated to the first communication unit from a second communication unit and transmit a second unique identification allocated to the information-processing device to the second communication unit;

an identification list configured to store at least one unique identification which is transmitted from the second communication unit through the second interface; and an identification judgment unit configured to determine whether the first unique identification received through the first interface is stored in the identification list;

wherein, when a unique identification of another communication unit is stored in the identification list, the another communication unit has to be located within the range of the short-range communication and has performed mutual authentication with the second communication unit, wherein when the identification judgment unit determines that the unique identification of the first communication unit is stored in the identification list, the first interface allows the content to be transmitted to the first communication unit.

2. The information-processing device according to claim 1, wherein the first interface transmits the content in accordance with an Internet Protocol, and the second interface receives and transmits the first unique identification only when a round trip time between the second interface and the second communication unit is less than a given threshold value.

3. The information-processing device according to claim 1, further comprising an encryption-decryption processor configured to encrypt the second unique identification using a key obtained through an AKE (authentication and key exchange) processing, and transmit the encrypted second unique identification to the first communication unit through the first interface when the identification judgment unit determines that the first unique identification of the first communication unit is not stored in the identification list.

4. The information-processing device according to claim 3, wherein after the AKE processing has been completed, the identification judgment unit determines whether the first unique identification is stored in the identification list.

5. The information-processing device according to claim 1, wherein the identification list stores the first unique identification for communication between the first and the second communication units, and an interface identification for distinguishing the first communication unit from all of the other communication units; and the identification judgment unit determines whether the first unique identification of the first communication unit received through the first interface is stored in the identification list.

6. The information-processing device according to claim 5, wherein when the identification judgment unit determines that the first unique identification is stored in the identification list, the identification judgment unit executes the AKE processing.

7. The information-processing device according to claim 5, further comprising:

a key generator configured to generate a key for encrypting the content using the first unique identification.

8. An information-processing device communicating with a first and a second communication units through a network, comprising:

an identification list configured to store at least one unique identification, when the at least one unique identification is transmitted from another communication unit which is located within the range of the short-range communication and has performed mutual authentication with the second communication unit;

an interface configured to transmit a first unique identification, allocated to the information-processing device, to the first communication unit and receive a second unique identification allocated to the first communication unit;

an identification judgment unit configured to determine whether the second unique identification is stored in the identification list;

a first AKE (authentication and key exchange) processor configured to execute an AKE processing with the first communication unit when the second unique identification is stored in the identification list;

an encryption-decryption processor configured to receive an encrypted third unique identification, allocated to the second communication unit, from the first communication unit after the successful AKE processing; and a second AKE processor configured to execute an AKE processing with the second communication unit using the third unique identification for content cryptography.

9. The information-processing device according to claim 8, wherein:

the first interface transmits an identification check request, the first unique identification and address information of the second communication unit for the first communication unit to determine whether at least one of the second unique identification and a fourth unique identification allocated to the second communication unit is shared between the first communication unit and the second communication unit, and the first AKE processor executes the AKE processing with the first communication unit when at least one of the second unique identification and the fourth unique identification is shared between the first communication unit and the second communication unit.

10. The information-processing device according to claim 8, further comprising:

a unique identification table configured to store data indicating relationship between the first and the second communication units sharing a unique identification; and an identification search unit configured to search the first communication unit intervening between the information-processing device and the second communication unit based on the unique identification table.

11. An information-processing device communicating with a first and a second communication units through a network, comprising:

an identification list configured to store at least one unique identification, when the at least one unique identification is transmitted from another communication unit which is located within the range of the short-range communication and has performed mutual authentication with the second communication unit;

an interface configured to transmit a first unique identification, allocated to the information-processing device, to the first communication unit and receive a second unique identification allocated to the first communication unit;

an identification check unit configured to determine whether the second unique identification is stored in the identification list;

a first AKE (authentication and key exchange) processor configured to execute an AKE (authentication and key exchange) processing with the first communication unit when the second unique identification is stored in the identification list;

an encryption-decryption processor configured to receive an encrypted third unique identification, allocated to the first communication unit as a key, from the first communication unit after the successful AKE processing when the third unique identification is not stored in the identification list, the third unique identification is shared with the second communication unit; and a second AKE processor configured to execute an AKE processing with the second communication unit using the third unique identification for communicating encrypted content with the second communication unit.

12. An information-processing device communicating with a first and a second communication units, comprising:

an identification list configured to store at least one unique identification, when the at least one unique identification is transmitted from another communication unit which is located within the range of the short-range communication and has performed mutual authentication with the second communication unit;

an interface configured to receive a first unique identification allocated to the first communication unit and address information of the second communication unit from the first communication unit in response to an identification check request;

an identification check unit configured to determine whether the first unique identification is stored in the identification list, receive a second unique identification allocated to the second communication unit when the first unique identification is stored in the identification list, and determine whether the second unique identification is stored in the identification list; and an encryption-decryption processor configured to transmit an encrypted third unique identification, allocated to the first communication unit as a key, to the second communication unit and transmit an encrypted fourth unique identification, allocated to the second communication unit as a key, to the first communication unit, when the second unique identification is stored in the identification list.

13. The information-processing device according to claim 12, wherein when the second unique identification is not stored in the identification list, the interface forwards the first unique identification, the address information and the identification check request to a third communication unit available to intervene between the information-processing device and the second communication unit.

14. An information-processing device communicating with a first and a second communication units, comprising:

an identification list configured to store at least one unique identification, when the at least one unique identification is transmitted from another communication unit which is located within the range of the short-range communication and has performed mutual authentication with the second communication unit;

an interface configured to receive a first unique identification allocated to the first communication unit and address information of the second communication unit from the first communication unit in response to an identification check request;

an identification judgment unit configured to determine whether the first unique identification is stored in the identification list, receive a second unique identification allocated to the second communication unit when the first unique identification is stored in the identification list, and determine whether the second unique identification is stored in the identification list; and an encryption-decryption processor configured to transmit an encrypted third unique identification, allocated to the information-processing device as a key, to the first and the second communication units when the second unique identification is stored in the identification list.

15. An information-processing device, comprising:

a first interface configured to transmit content to a first communication unit through a network;

an identification list configured to store both of at least one unique public identification and at least one first corresponding secret identification, the at least one unique public identification and the at least one first corresponding secret identification being transmitted from another communication unit which is located within the range of a short-range communication and has performed mutual authentication with the information-processing device;

a first AKE (authentication and key exchange) processor configured to execute an AKE processing with the first communication unit;

a second interface configured to receive an encrypted second secret identification allocated to the first communication unit after the successful AKE processing when the second secret identification is not stored in the identification list; and a second AKE processor configured to execute an AKE processing with the first communication unit using the second secret identification.

16. An information-processing device communicating with a first and a second communication units, comprising:

an identification list configured to store both of at least one unique public identification and at least one corresponding secret identification, the at least one unique public identification and the at least one corresponding secret identification being transmitted from another communication unit which is located within the range of a short-range communication and has performed mutual authentication with the information-processing device;

an interface configured to receive a first unique public identification allocated to the first communication unit and address information of the second communication unit from the first communication unit in response to an identification check request;

an identification judgment unit configured to determine whether the first unique public identification is stored in the identification list, receive a second unique public identification allocated to the second communication unit when the first public unique identification is stored in the identification list, and determine whether the second unique public identification is stored in the identification list; and an encryption-decryption processor configured to transmit the secret identification to the second communication unit when the second unique public identification is stored in the identification list.

* * * * *